INVENTOR.
WALTER B. PAYNE

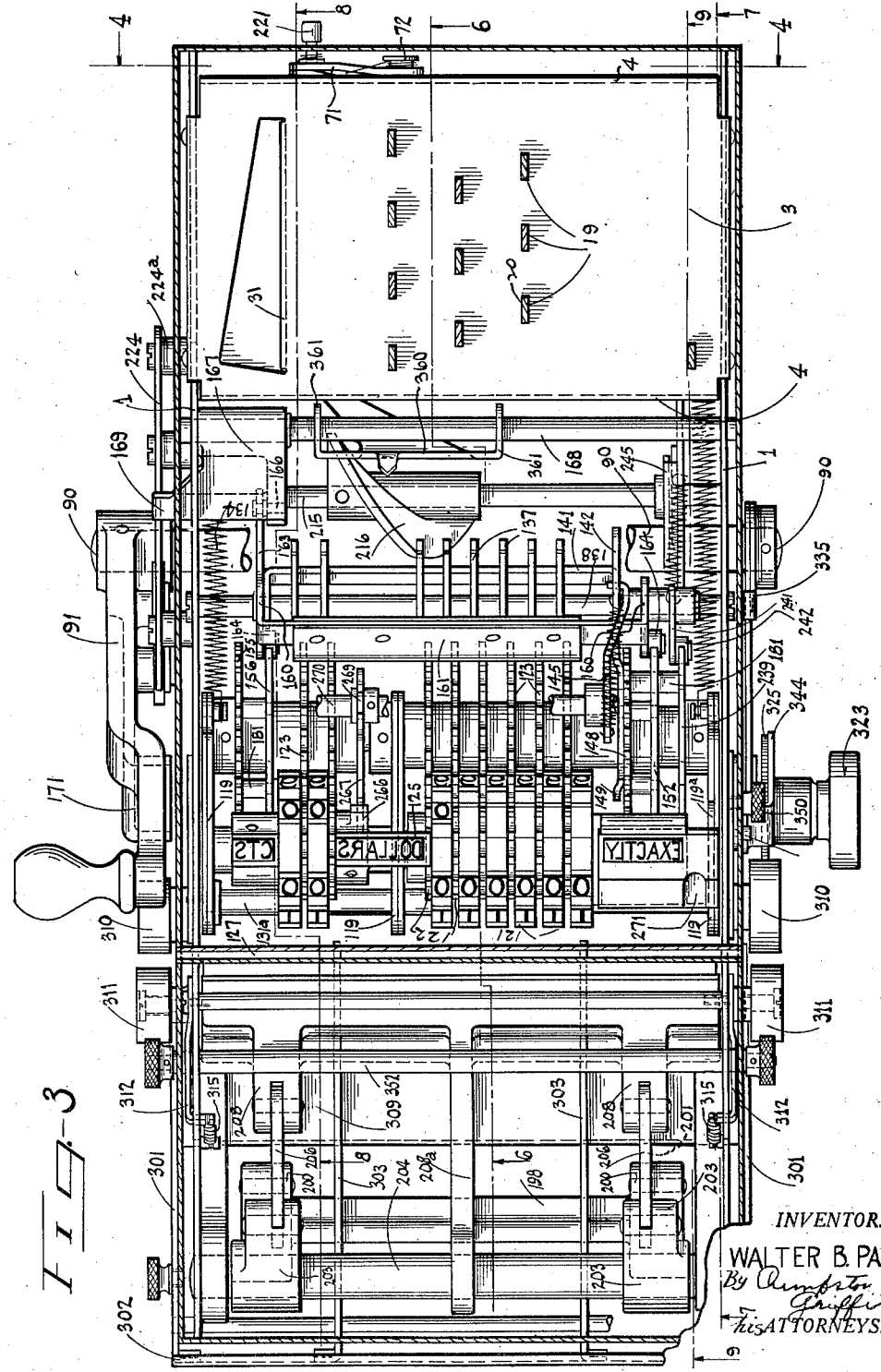

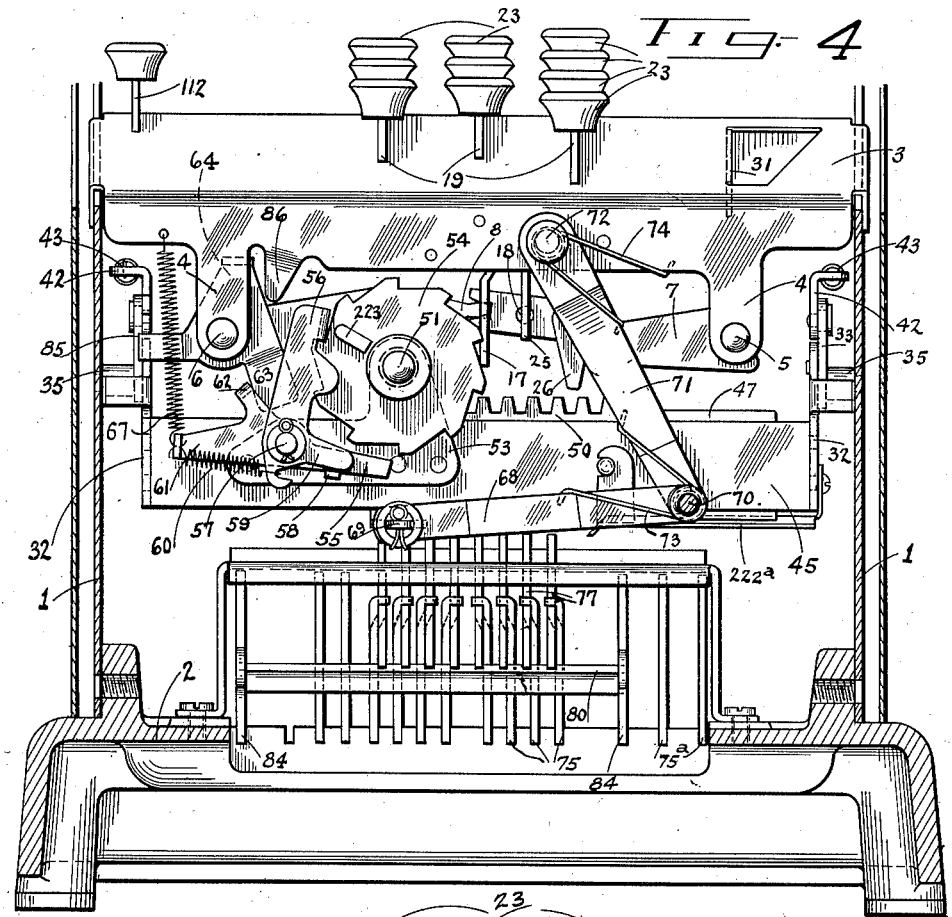
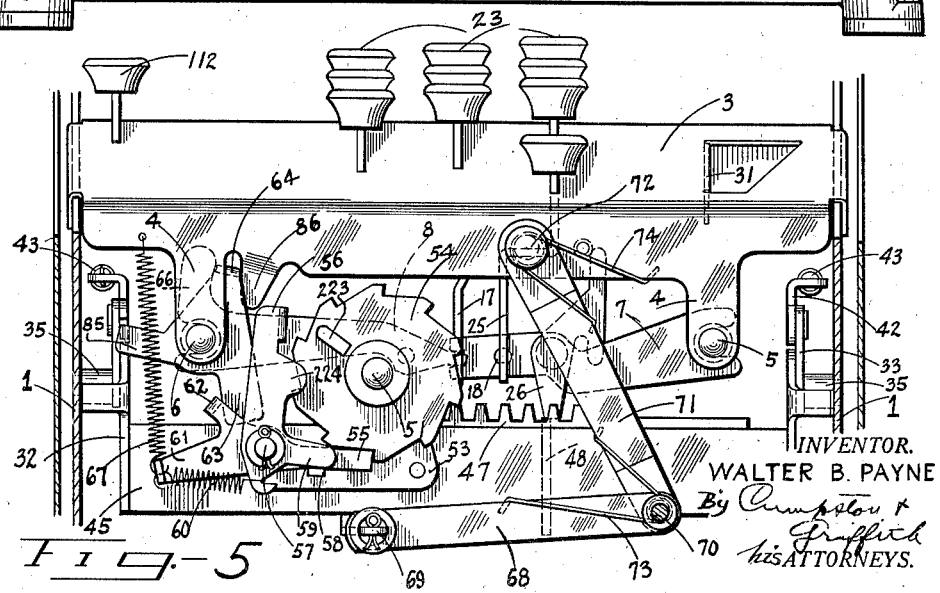

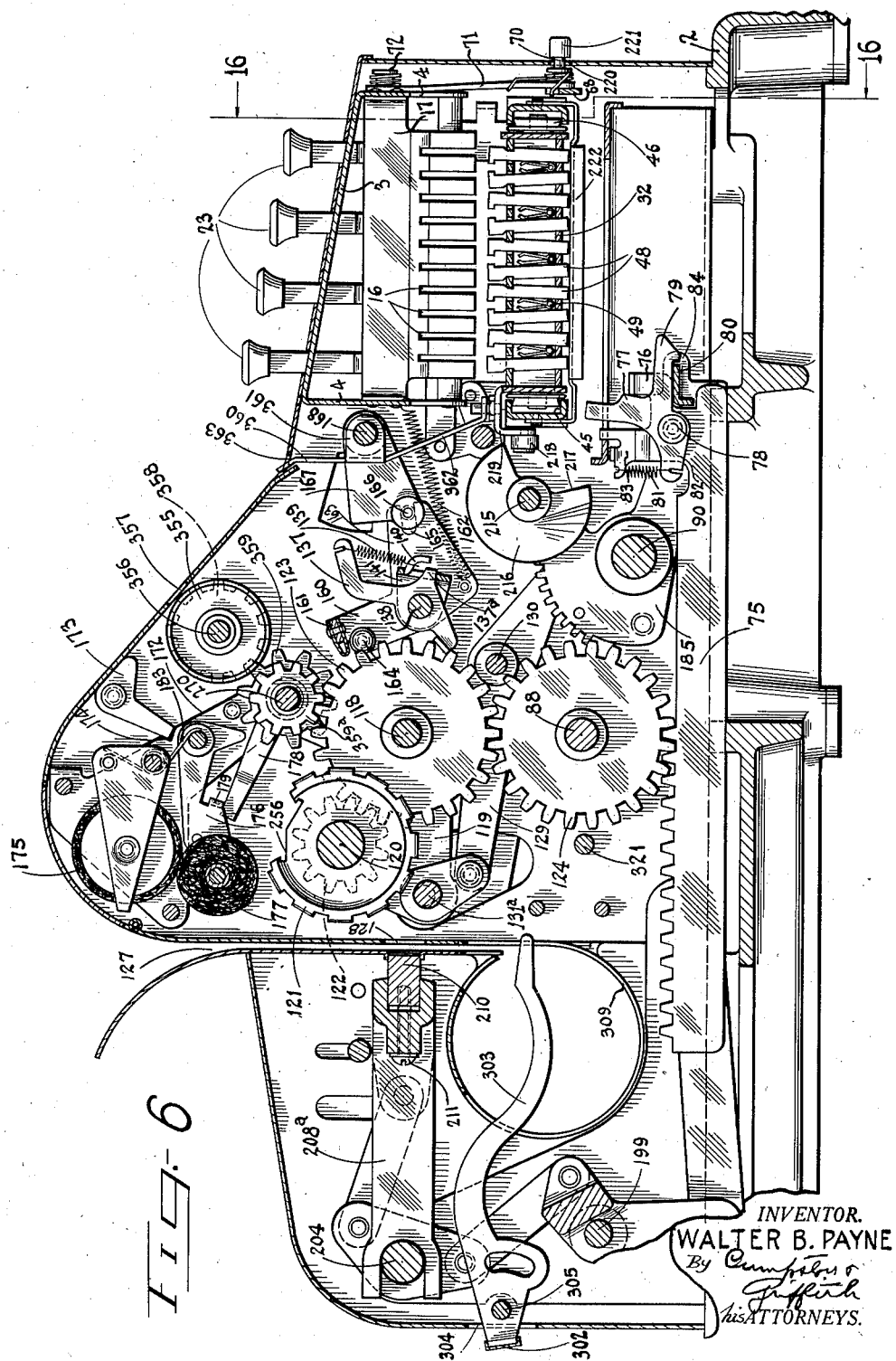

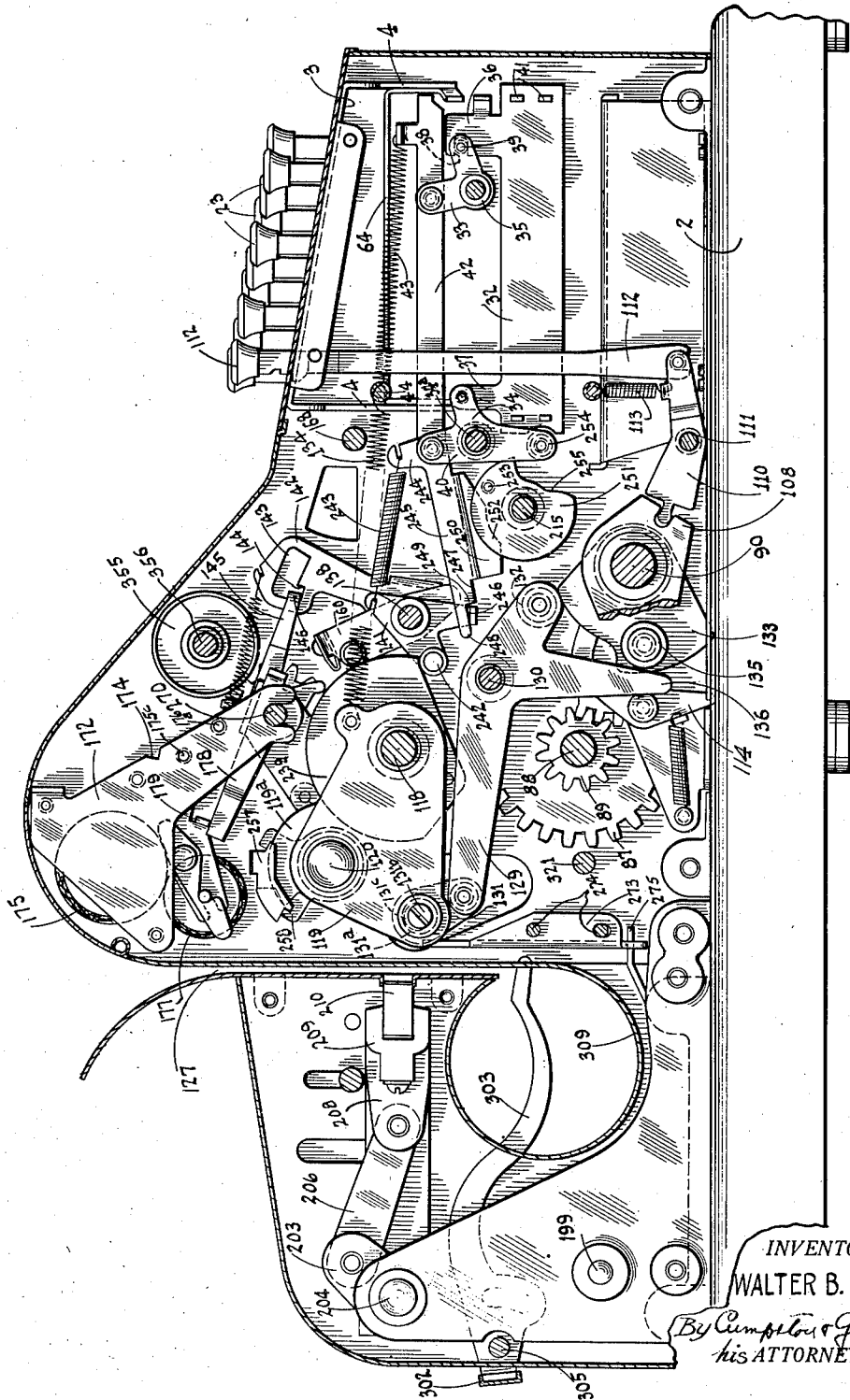

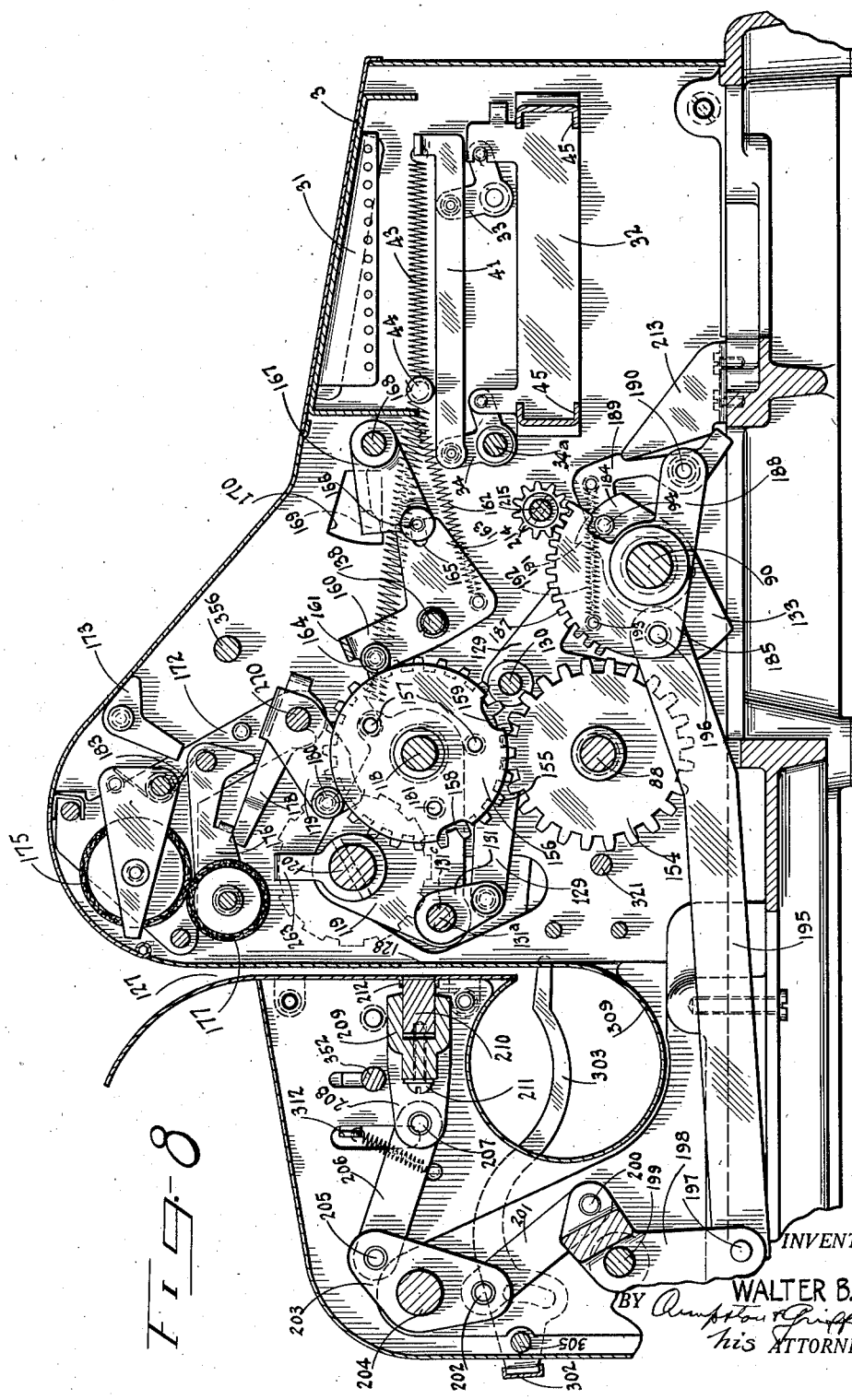

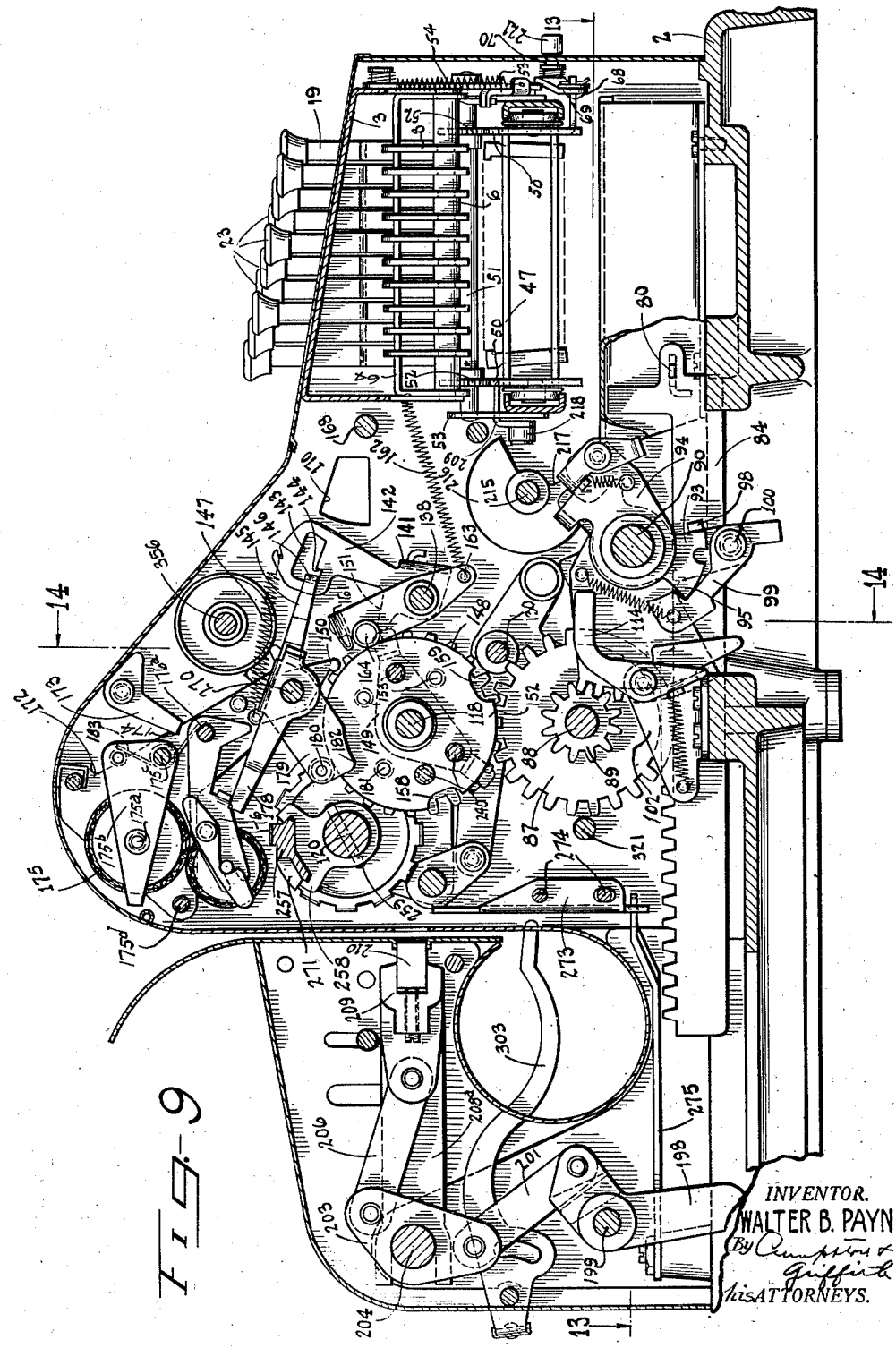

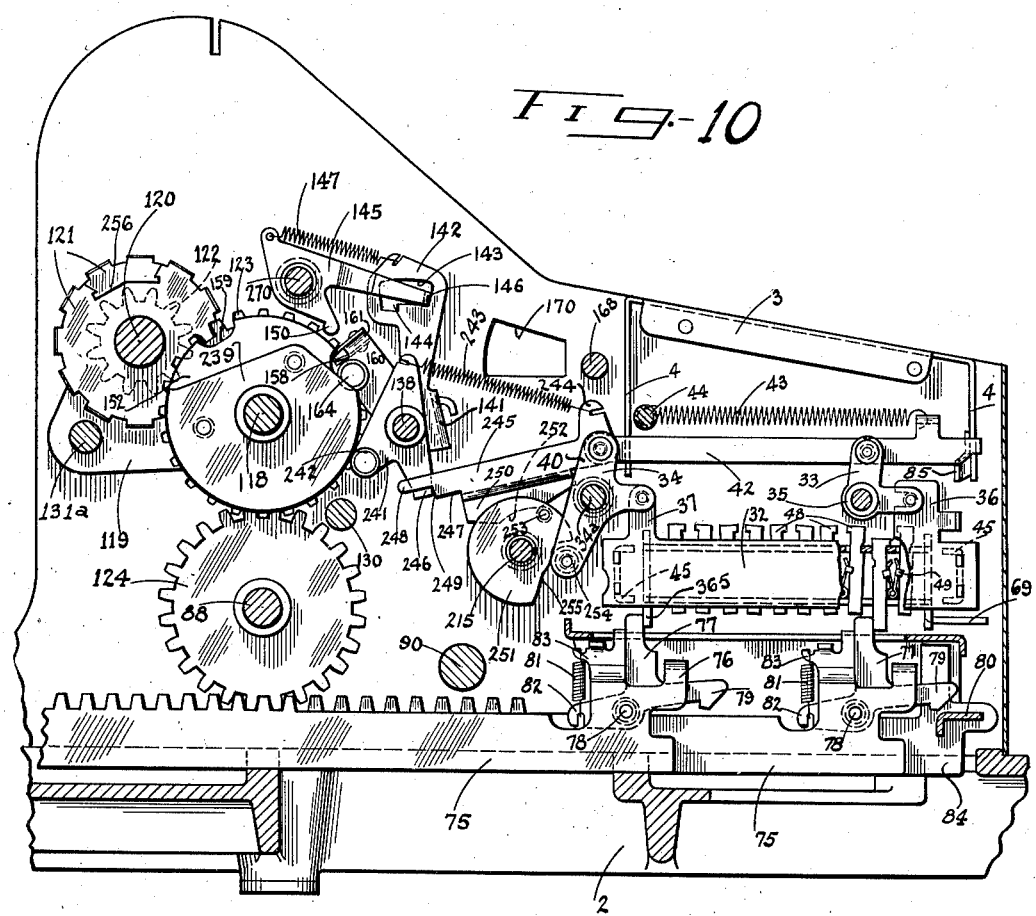

Jan. 7, 1930.                    W. B. PAYNE                    1,742,274
             MACHINE FOR SETTING UP AND PRINTING CHARACTERS
                     UPON RELATIVELY SMALL FORMS
                  Filed May 19, 1926       18 Sheets-Sheet 9
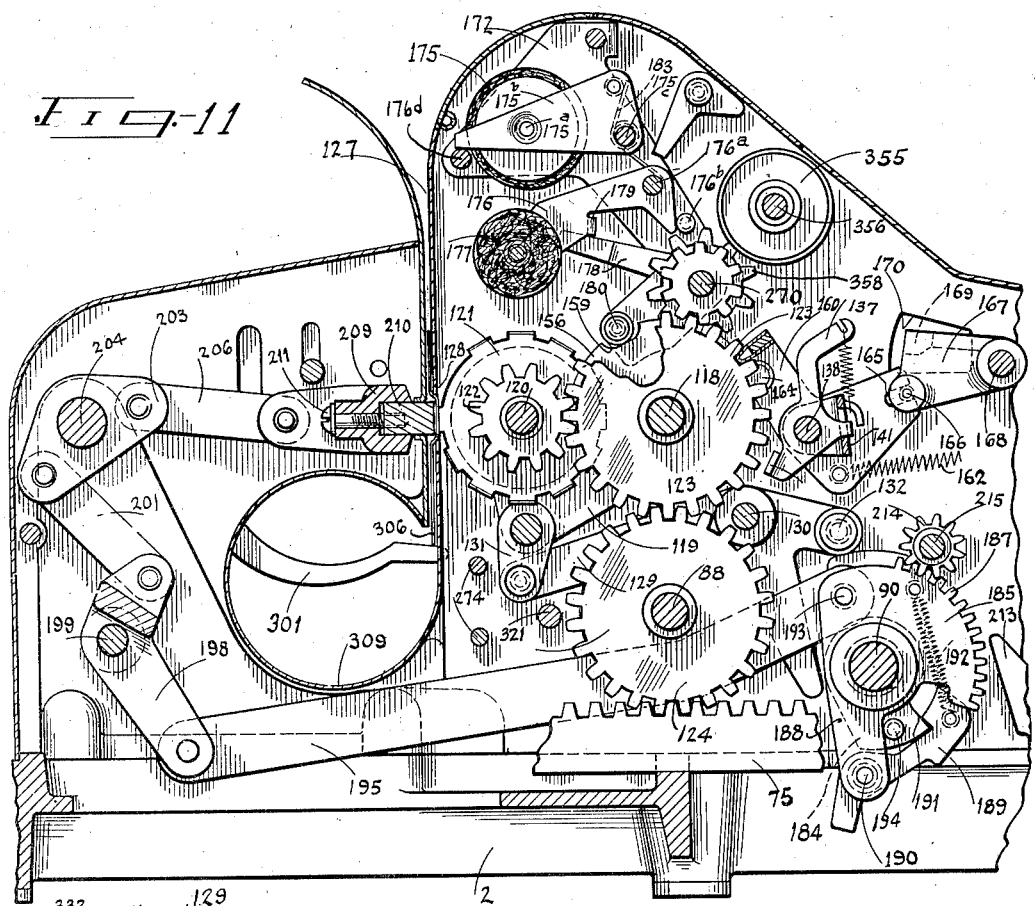
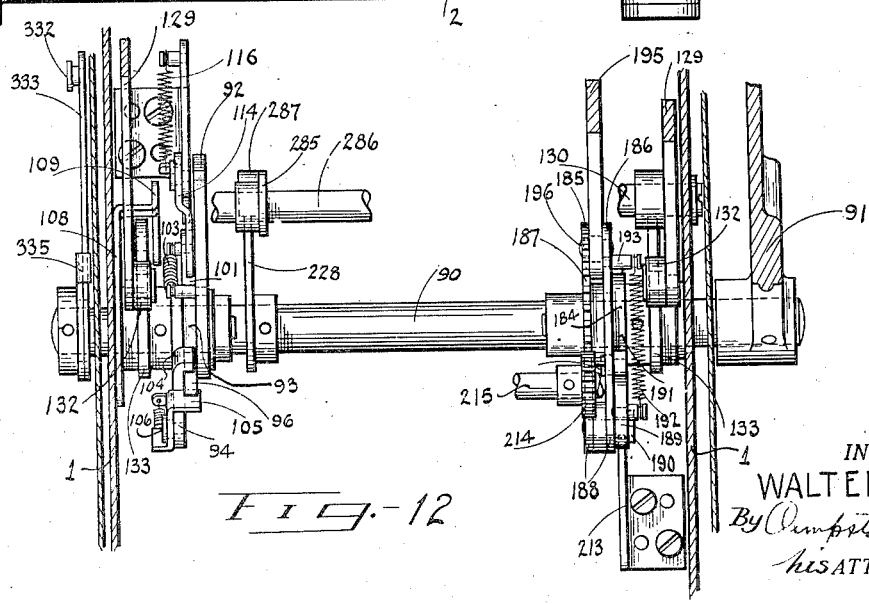
INVENTOR.
WALTER B. PAYNE
his ATTORNEYS.

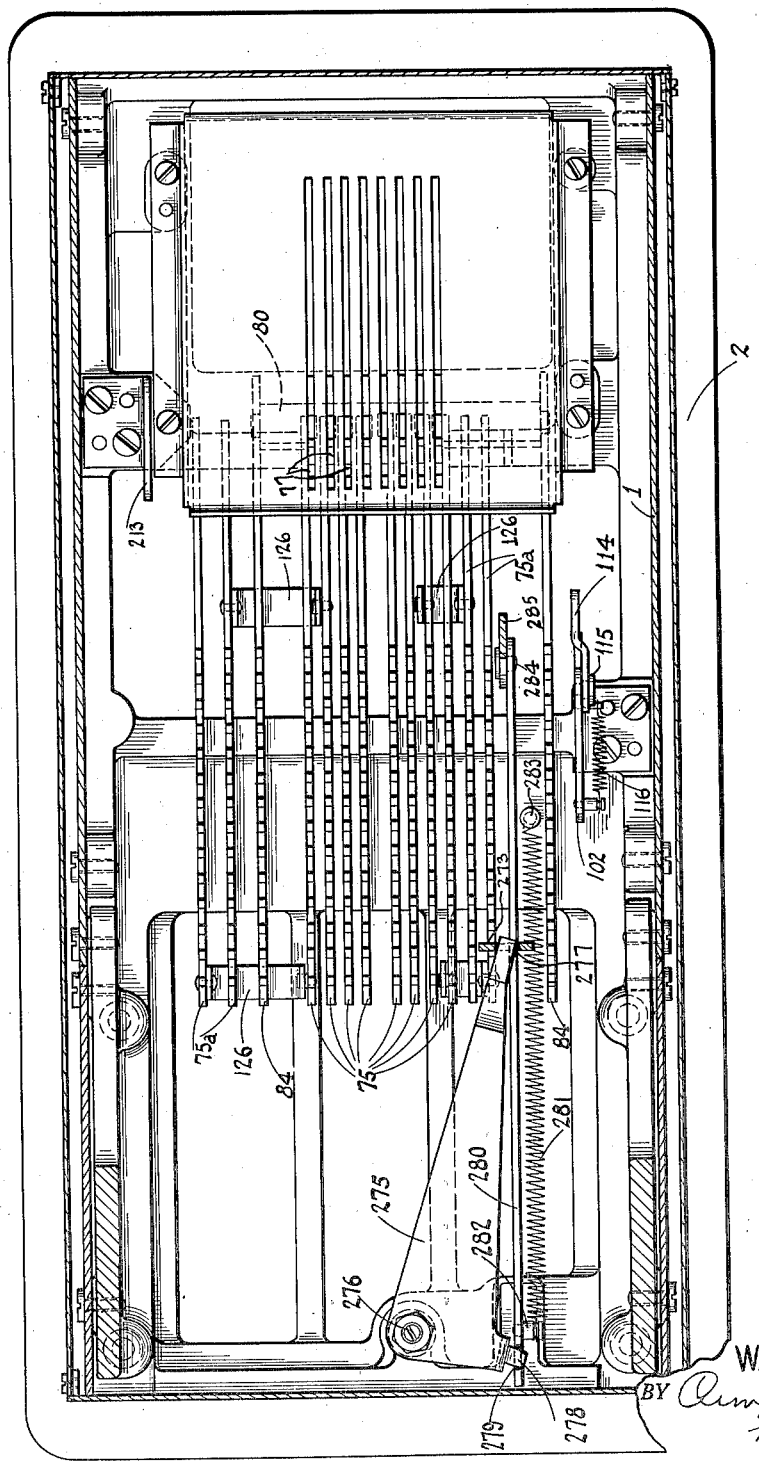

Jan. 7, 1930.  W. B. PAYNE  1,742,274
MACHINE FOR SETTING UP AND PRINTING CHARACTERS
UPON RELATIVELY SMALL FORMS
Filed May 19, 1926   18 Sheets-Sheet 11
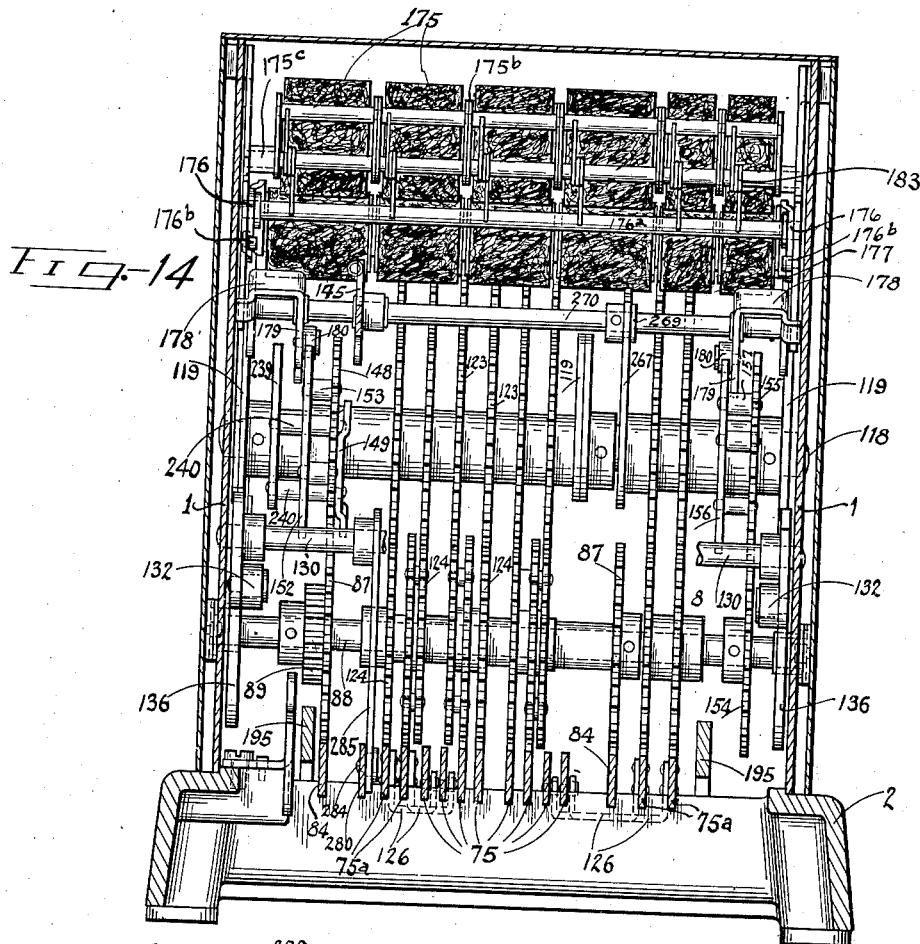
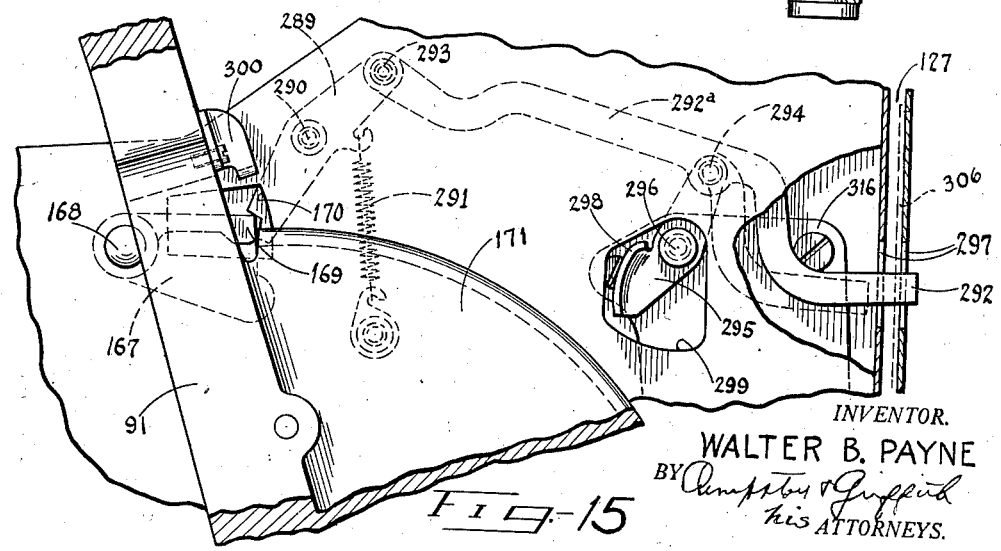
INVENTOR.
WALTER B. PAYNE Jan. 7, 1930.  W. B. PAYNE  1,742,274
MACHINE FOR SETTING UP AND PRINTING CHARACTERS
UPON RELATIVELY SMALL FORMS
Filed May 19, 1926  18 Sheets-Sheet 12

INVENTOR.
WALTER B. PAYNE
BY
his ATTORNEYS.

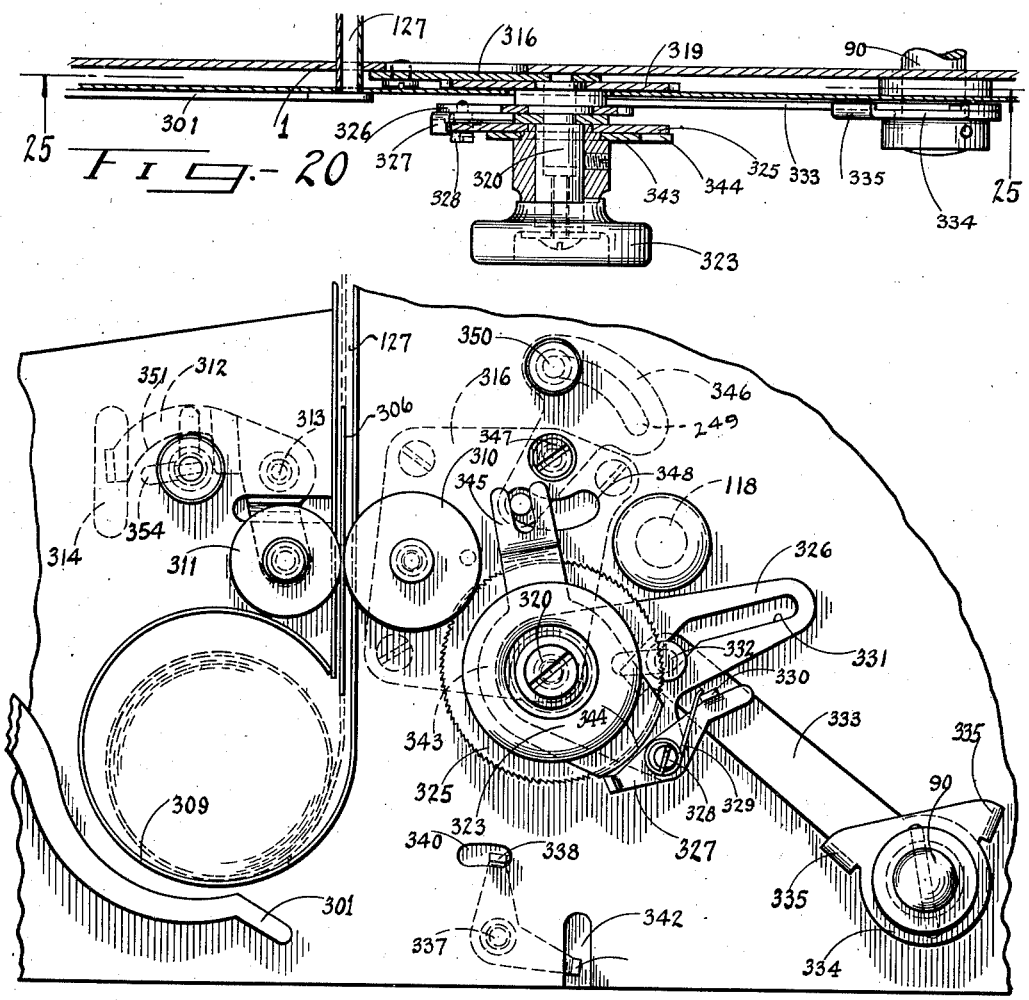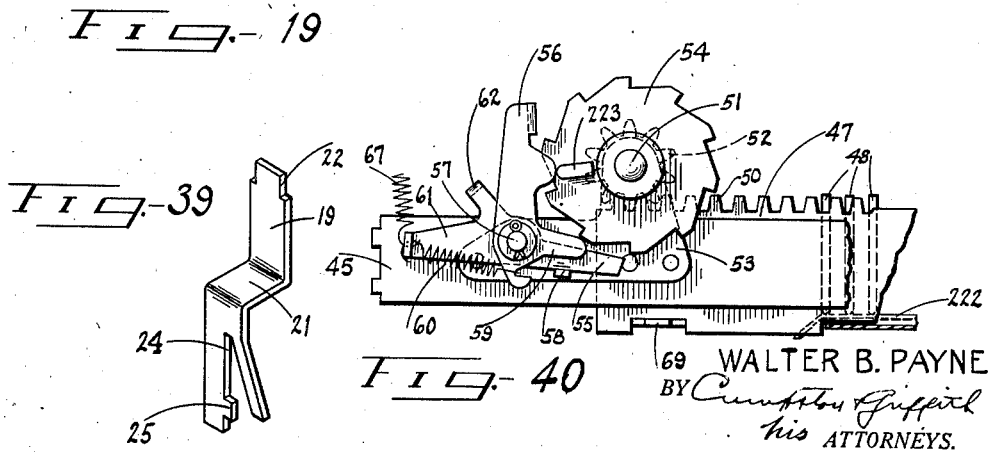

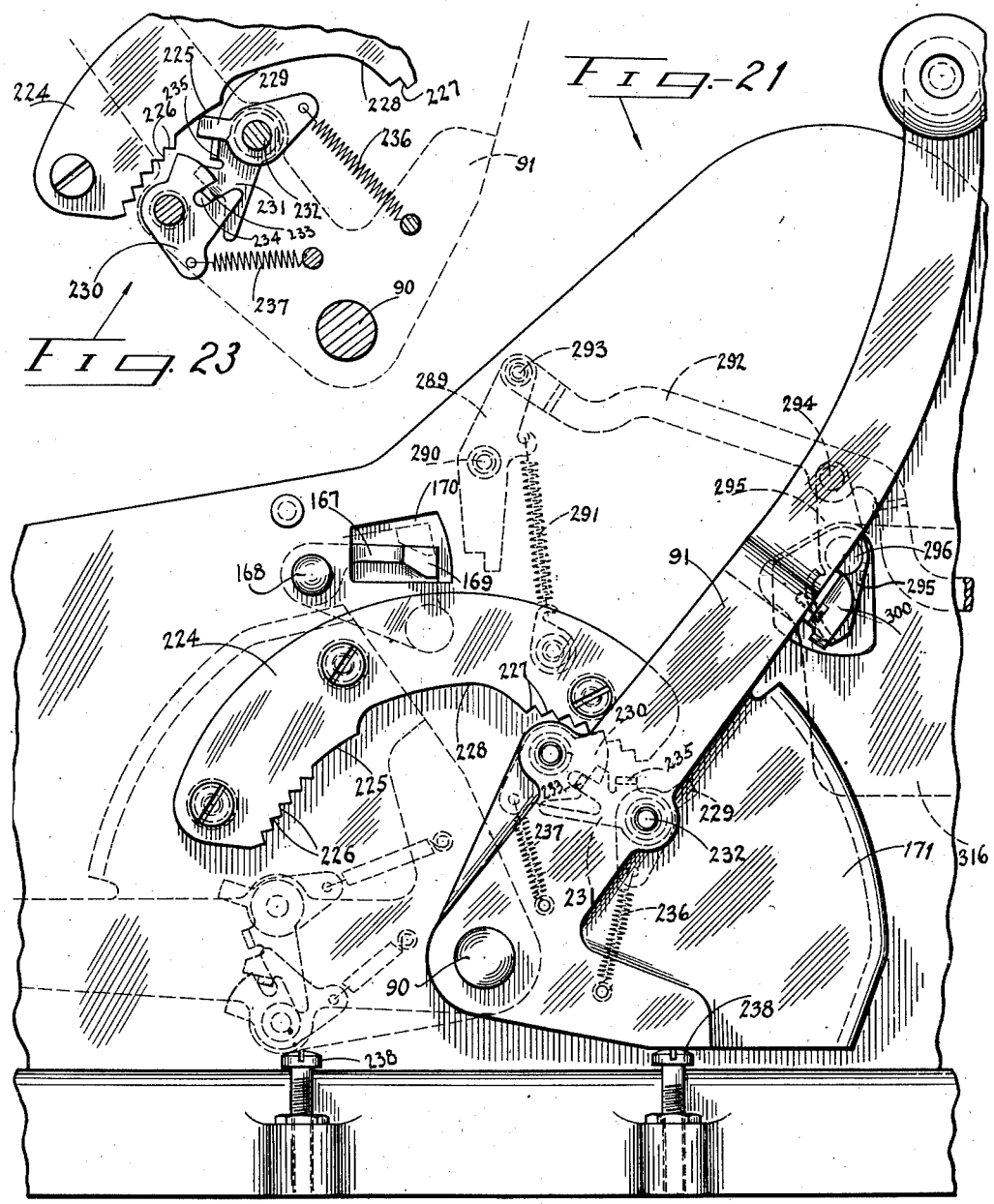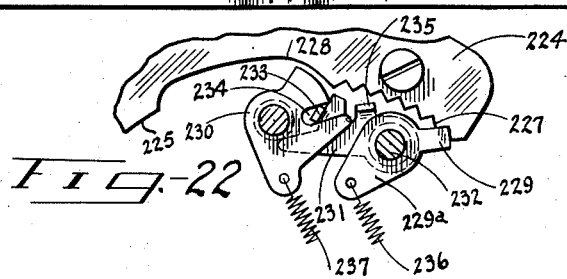

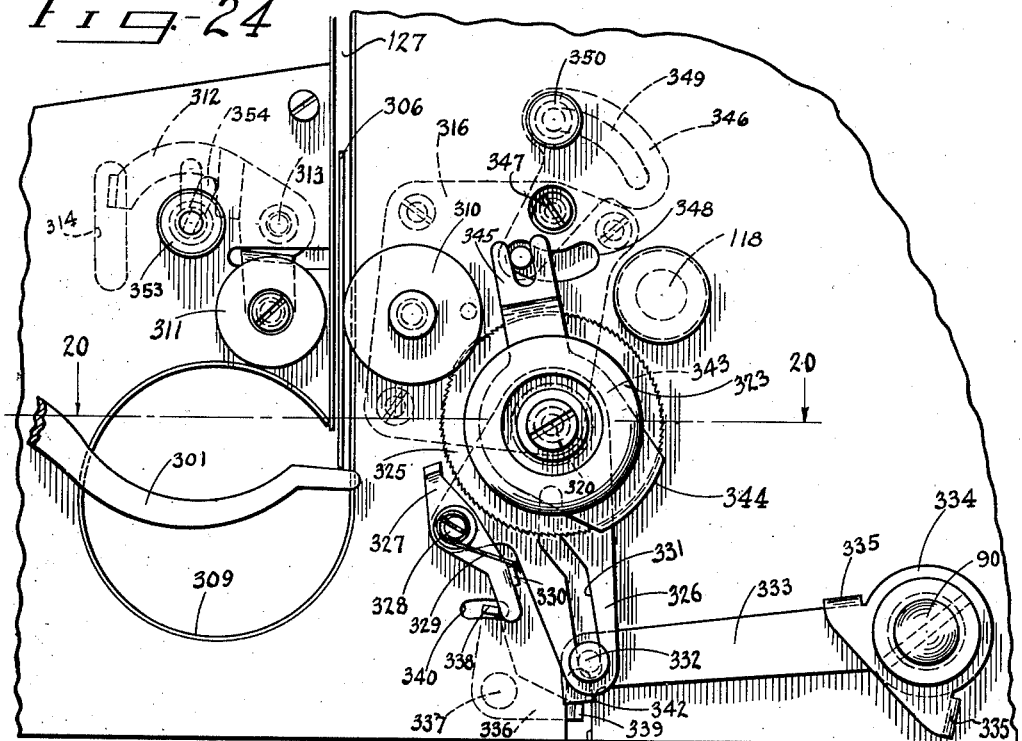
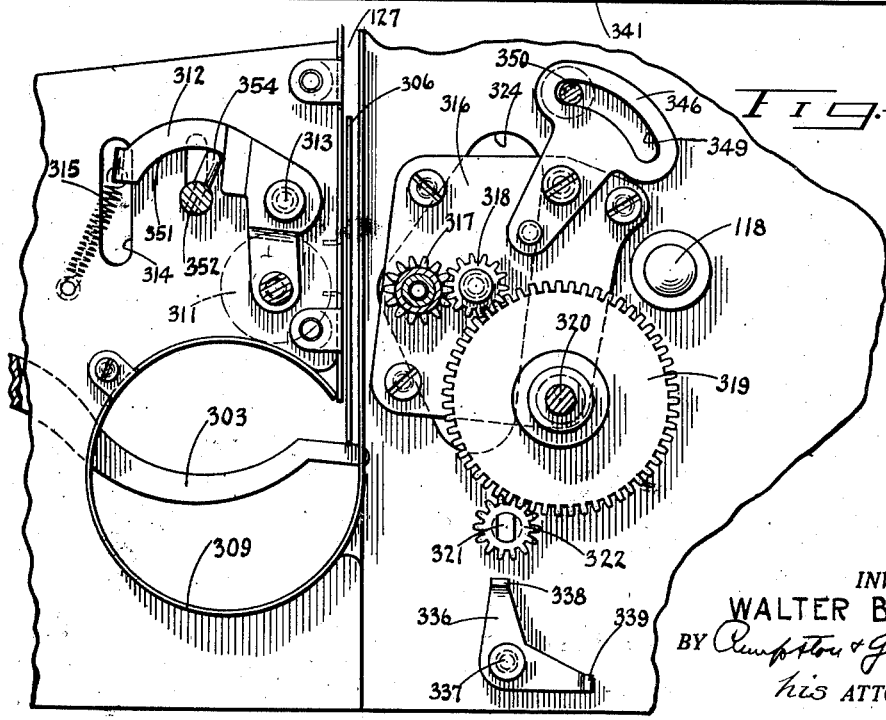

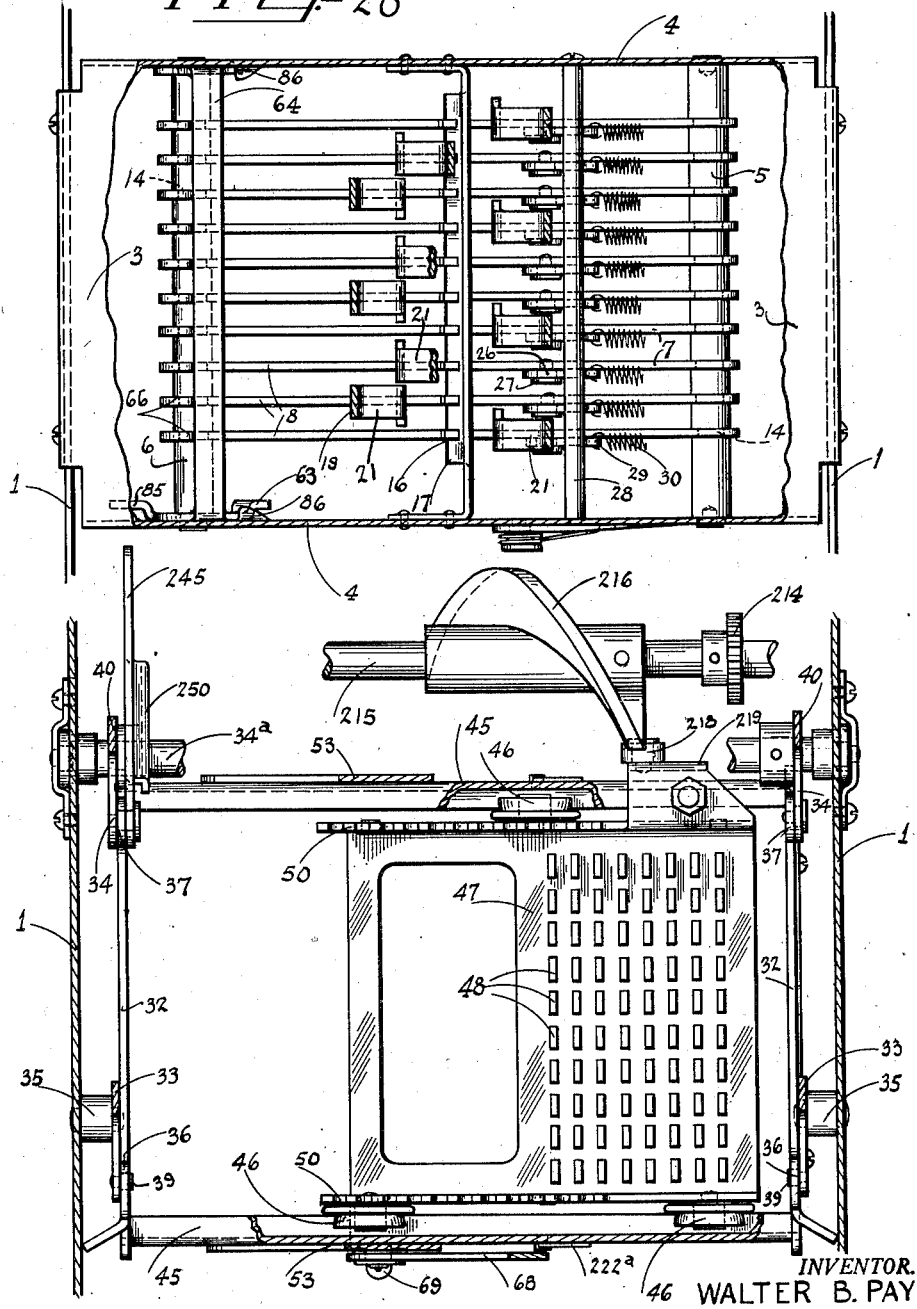

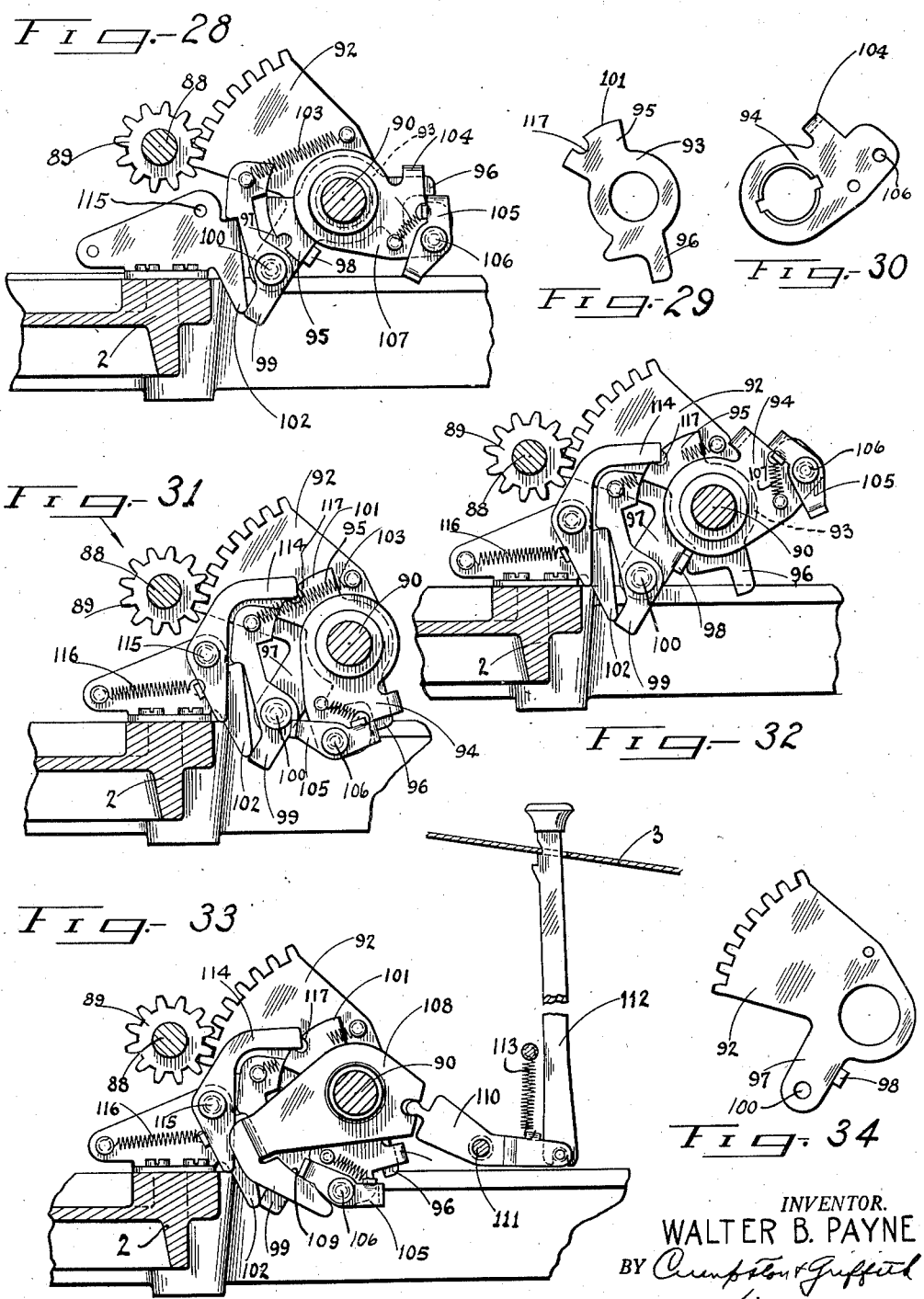

Jan. 7, 1930.                    W. B. PAYNE                    1,742,274
              MACHINE FOR SETTING UP AND PRINTING CHARACTERS
                        UPON RELATIVELY SMALL FORMS
                        Filed May 19, 1926        18 Sheets-Sheet 18
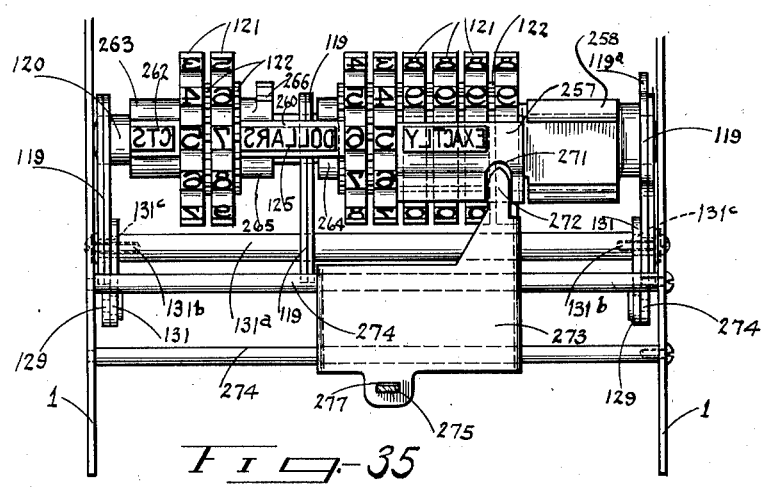
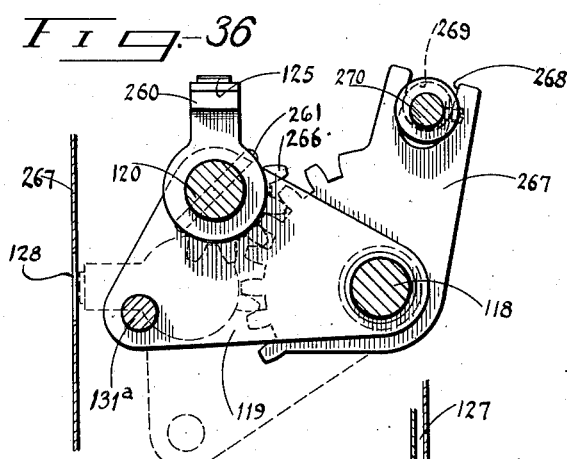
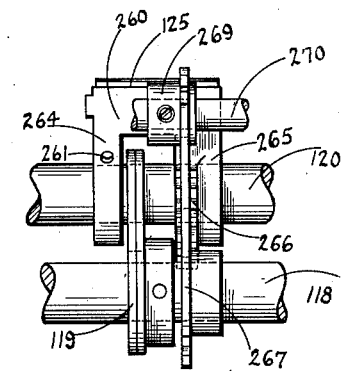
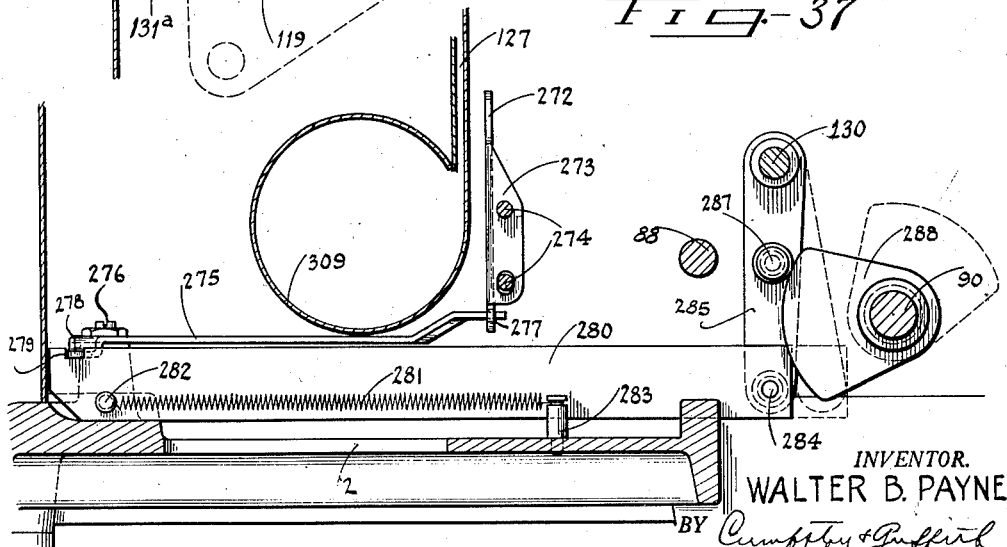
INVENTOR.
WALTER B. PAYNE
BY
his ATTORNEYS.

Patented Jan. 7, 1930

1,742,274

UNITED STATES PATENT OFFICE

WALTER B. PAYNE, OF ROCHESTER, NEW YORK, ASSIGNOR TO THE TODD COMPANY, OF ROCHESTER, NEW YORK, A CORPORATION OF NEW YORK

MACHINE FOR SETTING UP AND PRINTING CHARACTERS UPON RELATIVELY-SMALL FORMS

Application filed May 19, 1926. Serial No. 110,300.

This invention relates generally to machines for setting up and printing characters upon relatively small forms, such as upon strips or sheets of paper, checks, notes, drafts, etc., being particularly applicable to the setting up and printing upon small forms such as checks, notes and drafts, the amounts payable.

An object of the invention is to improve such machines, simplify their operation, and enable the setting up and printing of the desired characters by a minimum number of manual manipulations.

A further object of the invention is to provide an improved machine for setting up and printing characters with which an entire amount indication may be printed at a single printing operation, which may be operated to print the same set up repeatedly without a new set up at each successive printing operation.

A further object is to provide an improved check writing machine which will be exceptionally simple and rapid in operation, which will require a minimum amount of energy for operation, and which will be relatively simple, durable and inexpensive.

Various other objects and advantages will appear from the following description of one embodiment of the invention, and the novel features will be particularly pointed out hereinafter in the appended claims.

In the accompanying drawing:

Fig. 3 is a sectional plan of the same with the shell in section, and the inking frame removed in order to show the character bearing wheels and other parts;

Fig. 4 is a sectional elevation of a portion of the same, with the section taken approximately along the lines 4—4 of Fig. 3, the parts being shown as in normal or starting position;

Fig. 5 is a similar sectional elevation, but with the parts shown in a different relative position caused by the depression of one key;

Fig. 6 is a longitudinal sectional elevation of the same, with the section taken approximately along the lines 6—6 of Fig. 3;

Fig. 7 is another longitudinal sectional elevation of the same, with the section taken approximately along the lines 7—7 of Fig. 3;

Fig. 8 is still another longitudinal sectional elevation of the same, with the section taken approximately along the line 8—8 of Fig. 3;

Fig. 9 is another longitudinal sectional elevation of the same, with the section taken approximately along the line 9—9 of Fig. 3;

Fig. 10 is a partial longitudinal sectional elevation of the same, with the section taken somewhat similar to that shown in Fig. 7, but indicating the relative position of the parts of the set up mechanism at the end of the set up movement;

Fig. 11 is a partial longitudinal sectional elevation of the same, somewhat similar to Fig. 8 but indicating the relative position of the parts at the end of a printing operation;

Fig. 12 is a sectional plan of certain mechanism of the same, which is operated by the main power or driving shaft;

Fig. 13 is a sectional plan of the machine, with the section taken approximately along the line 13—13 of Fig. 9;

Fig. 14 is a transverse sectional elevation of a portion of the machine and illustrating particularly the inking mechanism;

Fig. 15 is a side elevation, partly in section, of the mechanism for preventing operation of the printing mechanism in the absence of a form or blank from a position to be printed upon;

Fig. 19 is a side elevation of a portion of the machine, illustrating on a somewhat larger scale than in Fig. 2 the form feed mechanism;

Fig. 20 is a sectional plan of the same, with the section taken approximately along the line 20—20 of Fig. 24;

Fig. 21 is a side elevation of a portion of the machine and illustrating the full stroke mechanism and certain safety mechanism for preventing operation of the main operating handle under certain undesirable conditions;

Fig. 22 is a fragmentary elevation of certain parts of the full stroke mechanism, showing the position of the parts of the locking mechanism after a partial setting up stroke;

Fig. 23 is a partial side elevation of elements of the full stroke mechanism in the positions occupied during a partial return movement of the main operating handle;

Fig. 24 is another side elevation of a portion of the machine, and illustrating the paper or form feed mechanism, the elevation being similar to Fig. 19 but illustrating the parts in a different operating position;

Fig. 25 is a sectional elevation similar to Fig. 24 but having the outer wall removed in order to show interior parts, and with the section taken approximately along the line 25—25 of Fig. 20;

Fig. 26 is a sectional plan of the key mechanism, but with the section taken under the key board plate.

Fig. 27 is a sectional plan of the machine and illustrating the carriage, its support, and mechanism for causing its return.

Fig. 28 is a sectional elevation of a portion of the machine, and illustrating certain details of the setting clutch;

Fig. 29 is an elevation of the details of the same;

Fig. 30 is an elevation of another of the details of the same;

Fig. 31 is an elevation similar to Fig. 28, but illustrating the parts in a different operative relation, such as in the positions occupied at the end of the main or forward operation of the operating handle;

Fig. 32 is a similar elevation, but with the parts in the positions occupied at the end of an operation during which the repeat key was effective;

Fig. 33 is an elevation somewhat similar to Fig 31, but illustrating the action of the repeat mechanism;

Fig. 34 is an elevation of the main driving sector gear of the mechanism shown in Figs. 28 to 33;

Fig. 35 is a sectional elevation through a portion of the machine, and illustrating the character bearing wheels in a position for printing;

Fig. 36 is a transverse sectional elevation of the machine through the dial shaft, and showing mechanism for shifting the "dollar" type into printing position during a printing operation;

Fig. 37 is another elevation of the mechanism shown in Fig. 36;

Fig. 38 is a sectional elevation of a portion of the machine, and illustrating the mechanism for actuating the limit character;

Fig. 39 is a perspective of one of the key stems before its attachment to one of the key levers; and Fig. 40 is an elevation of the escapement mechanism in one operative condition, at the extreme limit of the return travel of the carriage.

Figure 1:
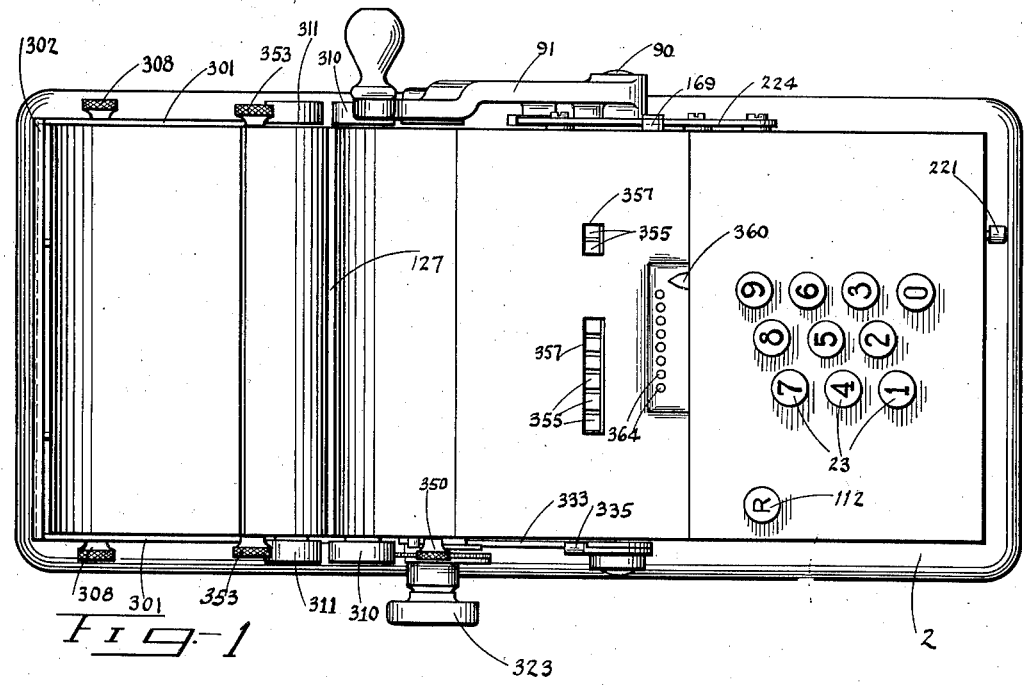
Fig. 1 is a plan of a check writing machine constructed in accordance with this invention.
Figure 2:
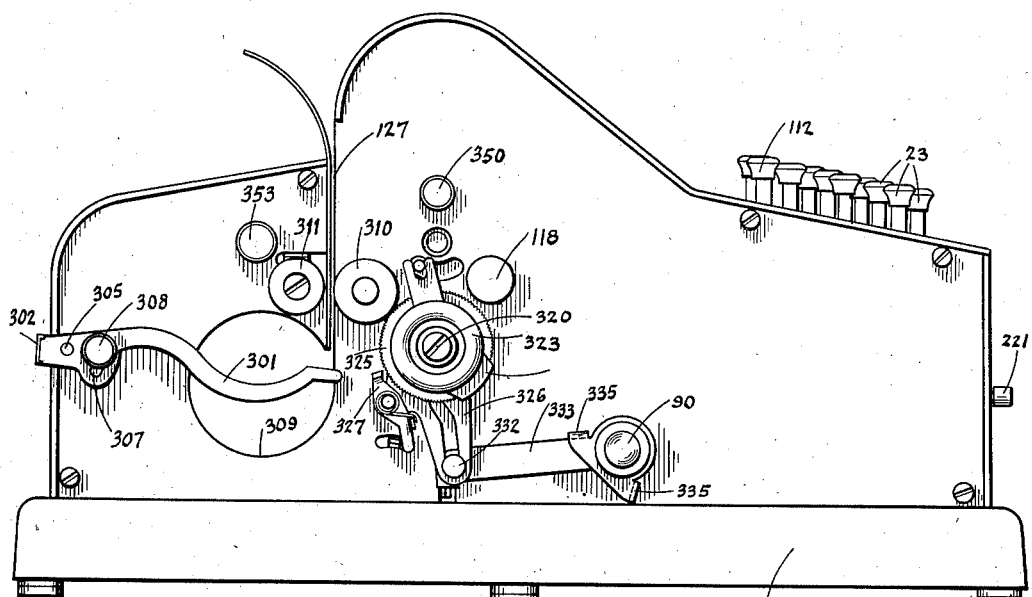
Fig. 2 is a side elevation of the same.

For explanatory purposes the invention has been illustrated in connection with a machine for writing amounts payable upon small forms, such as checks, notes, drafts, etc. It includes an enclosing casing or frame 1 of suitable shape and size, which is mounted upon a suitable base 2. The casing or frame 1 includes a key board plate 3, which is removably attached thereto in any suitable manner. The plate 3 is provided with inwardly depending ears 4 (see Figs. 4, 7 and 16) for supporting a pair of pivot rods 5 and 6. The rods 5 and 6 extend in a direction lengthwise of the casing, that is, forwardly and rearwardly, and substantially parallel to one another. These rods 5 and 6 are spaced apart and serve as pivotal supports for a plurality of setting levers 7 and 8. The levers 7, which are mounted upon the rod 5, are provided with slots 9 extending inwardly from an end so as to slide over the rod 5 when assembled thereon. The levers 8 are similarly provided with notches 10 by which they may be separately slid over the rod 6 in a direction transverse to the length of the rod in order to form their pivotal support.

The levers 7 upon the rod 5 extend toward the levers 8 upon the rod 6 and the levers 8 extend toward those upon the rod 5. The levers 7 and 8 overrun with one another between the rods 5 and 6, and have pin and slot connections with one another in pairs. For example, the levers 7 may have notches 11 in their free ends for rockably receiving the tongues 12 provided upon the free ends of the levers 8, the slots and tongues being such as to permit of a rocking movement while remaining coupled in order that the coupled levers may oscillate together to a limited extent. Each lever of a pair, by its coupling to the other lever of that pair holds it from sliding off of its pivot rod.

The levers on each rod may be spaced apart from one another in any suitable manner, such as by the recesses 14 in rods 5 and 6, Fig. 26. The coupled ends of each pair of levers 7 and 8 are preferably in the same plane with one another, and received in a slit 16 (see Figs. 6, 16 and 26) in a comb plate 17, which is secured to depending flanges of the plate 3 so as to extend between the pivot rods 5 and 6 and in a parallel direction thereto. The walls of each slot 16 of the comb plate 17 serve to prevent disengagement from one another of the levers 7 and 8 of each pair, and the spacing between the slots 16 corresponds to the spacing provided by recesses 14 on rods 5 and 6. The levers 7 and 8 are provided, at equal distances, from their pivot slots 9 and 10, with apertures 18 (see Fig. 16).

A plurality of key stems 19 (see Figs. 4, 16 and 39) are slidably supported in apertures 20 in the plate 3 and each stem beneath the plate 3 is laterally offset as at 21, the offsets being uniform for all of said key stems in order that all of the stems may be stamped from sheet metal by a single die. One of these stems, as first stamped, is illustrated separately in Fig. 39, and at its upper end is provided with a reduced portion 22 for receiving a key button 23 (see Fig. 16). Each stem 19 at its lower end is provided with a slot 24 (see Fig. 39) extending for some distance from its lower end. One arm of the forked end thus provided has an ear 25 extending across the slot, and the other arm of the stem is originally bent out of the plane of the other arm of that same end, as shown in Fig. 39. The forked end of each stem is slid down over a lever 7 or 8, and positioned with its ear 25 received in the aperture 18 of the lever which the forked end embraces.

Figure 16:
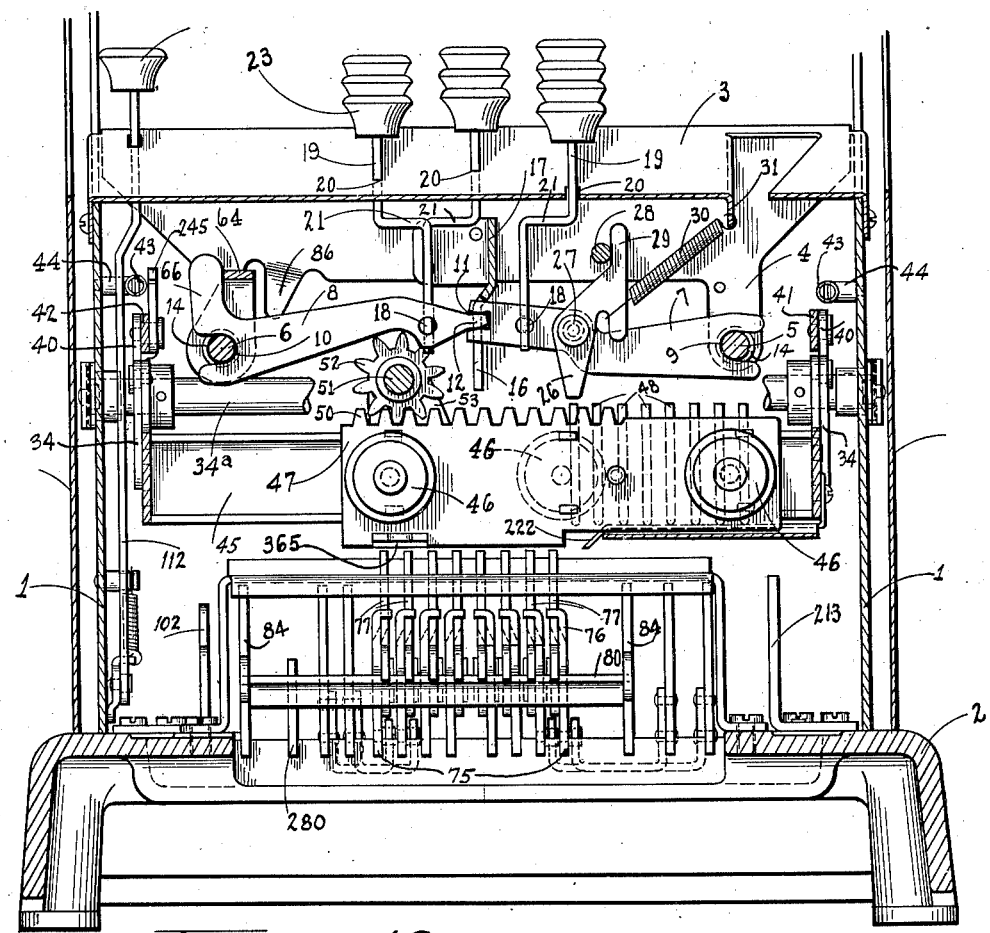
Fig. 16 is a transverse sectional elevation through the key board portion of the machine, on line 16—16 of Fig. 6 and illustrating the manner of selectively adjusting the settable stops.

The lever may be readily hooked over the ear 25, by reason of the bend in the other arm of the forked stem end, as shown in Fig. 39, after which the oblique arm will be bent into the plane of the other arm of the forked end, so as to lock the lever pivotally to the stem. By reason of the placing of the apertures 18 at equal distances from the pivot rods 5 and 6 upon which the levers are mounted, equal depressions of the key stems will always cause equal depressions or oscillations of the pairs of levers to which any stem may be connected. But one key stem will be attached to each pair of levers, and the key stems may be staggered in rows, even though formed of identical blanks or stampings, by merely assembling the stems with the offsets 21 extending in one direction or the other as shown in Figs. 16 and 26.

A plurality of dogs 26 (Figs. 16 and 26) are pivoted to one set of levers, such as the levers 7, the pivots 27 of such dogs being located at uniform distances from the pivot rods 5, so that the dogs will be arranged in a row running parallel to the rod 5. A cross rod 28 extends between flanges of the plate 3 and in a direction parallel to the rods 5 and 6, as well as above the dogs 26. Each dog 26 has a tail portion 29 which extends along a side of the cross rod 28 and bears against the same during its movements with the lever to which it is attached. A spring 30 may be connected between each dog 26 and a flange 31 that has been struck downwardly from the key board plate 3.

In view of the fact that the key board plate 3 extends at a slight incline, the flange 31 which is struck out therefrom will be somewhat triangular in shape in order that its lower end or edge when bent downwardly will extend approximately parallel to the pivot rod 5. The springs 30 may thus all be identical and will serve to yieldingly hold the dogs 26 upright and with their tail portions 29 sliding against the cross rod 28. The springs 30 are also preferably inclined upwardly toward the flange 31 to which they are attached, so that they will always pull upwardly upon the dogs, and thus also pull the levers 7 and 8 upwardly to the extent permitted by suitable limit stops, such as the ends of the slots 16 in the comb plate.

Referring now particularly to Figs. 6, 7, 8 and 27, a carriage support 32 is pivotally suspended from levers 33 and 34. The levers 33 are pivotally supported upon studs 35 carried upon the inner faces of the plates 1 adjacent the forward end of the casing. The levers 34 are secured to the rock shaft 34ª and thereby act in unison. The support 32 is provided with upstanding tongues 36 and 37 to which levers 33 and 34 are pivoted. The tongues 36 to which the levers 33 are connected are provided with transverse slots 38 in which pivot pins 39 carried by the levers 33 are slidingly received, which facilitates the assembly operation. The levers 33 are of the bell crank type, and the arms connected to the carriage support are normally approximately horizontal and their other arms substantially upright. The arms of the levers 34 to which the carriage support is pivotally attached are also approximately horizontal when in normal position. The levers 34 also have upstanding arms 40, which are approximately parallel to the upstanding arms of the levers 33.

The levers 33 and 34 are disposed adjacent the sides of the frame, and the levers at each side of the frame are connected by links 41 (see Fig. 8) and 42 (see Fig. 7 and Fig. 10). The links 41 and 42 thus serve with the levers 33 and 34 as a suspension for the carriage support 32, which will give the latter a somewhat parallel-like movement when the levers 33 and 34 are operated to raise or lower the support. Springs 43 may be connected between the links 41 and 42 and suitable pins 44 on the frame, so as to normally urge the links 41 and 42 rearwardly and elevate the carriage support 32.

The support 32 is provided with channel strips 45 which open toward one another, extend across the machine from side to side, and serve as tracks for rollers 46 that are rotatably mounted upon the carriage 47. Preferably two rollers 46 are provided upon the carriage for travel in one channel strip 45, and one or more rollers 46 provided upon the other side of the carriage for travel in the other channel track (see Fig. 27). A plurality of settable stops such as pins 48 are mounted in the carriage 47 for movement, transversely of the plane of travel of the carriage, into and out of set positions. The pins are arranged in rows of ten pins each, the rows running in directions transverse to the travel of the carriage, that is, in a direction parallel to the rows of dogs 26 with which the pins cooperate. The pins of each row are grouped in pairs with an interposed spring 49 between the pins of each pair, so as to yieldingly and frictionally hold the pins in either set or unset positions (see Fig. 6).

The carriage is provided along opposite edges with rack teeth 50 (see Figs. 16, 18 and 27) extending in the direction of travel. A shaft 51 extends above the carriage and transversely of its direction of travel, and carries pinions 52 which mesh with the rack teeth 50 of the carriage, and thus control the carriage movement. The shaft 51 is rotatably supported by plates 53 which extend upwardly from the carriage support (see Figs. 4 and 9), extends forwardly beyond the carriage support, and carries at its forward end a ratchet escapement wheel 54 which is fixed thereto.

Referring now particularly to Figs. 4, 5 and 40, a pair of escapement dogs 55 and 56 are separately pivoted upon the pin 57 that projects from one of the plates 53, the dogs extending in opposite directions from the pivot pin and along the escapement wheel for cooperation with the teeth of the escapement wheel. The dog 55 is provided with an ear 58 which engages with a tail 59 on the dog 56, so that whenever the dog 55 is rocked into engagement with the teeth of the ratchet wheel 54, it will also rock the dog 56 out of engagement with the ratchet wheel teeth, and permit a slight forward movement of the ratchet wheel, so that when the dog 55 is again released, it will move outwardly and the ratchet wheel will be released for a movement corresponding to the distance between two successive teeth until the dog 56 engages with the next tooth of the ratchet wheel. A spring 60 is connected between the dog 56 and a tail 61 of the dog 55, so as to normally rock the dog 56 in a direction to hold its tail portion 59 against the ear 58 of the dog 55. The dog 55 is also provided with an angular tail 62 which is adapted to engage a tail or arm 63 of a universal bar or bail 64 that is pivoted by its arms upon the rod 6 between the depending ears 4 of the key plate 3.

Referring now particularly to Figs. 5 and 16, one set of the key levers, such as the levers 8, are provided with tail portions 66 that extend into cooperative relation with the bar or bail 64, so that when any pair of levers 7 and 8 is operated by the depression of a key, the tail 66 of that pair of levers will engage and rock the universal bar or bail 64, and through the tail 63 of the latter will rock the dog 55 from the position shown in Fig. 4 to the position shown in Fig. 5.

This permits of a very slight movement of the carriage, and when a depressed key returns to its upper position and the levers 7 and 8 move upwardly, the universal bail or bar 64 will be released and in turn will release the dog 55. The latter will be returned to the position shown in Fig. 4 by the action of the spring 67, which is connected to the tail 61 of the dog 55, and to a suitable part of the key, plate 3. Thus at each depression of a key the escapement wheel will be released for a movement corresponding to the distance between two consecutive teeth. An arm 68 (Figs. 4 and 5) is pivoted, as at 69, to a depending lug on the carriage, and extends approximately horizontally therefrom. The free end of the arm 68 is pivotally connected by the pin 70 to the depending end of a lever arm 71, the latter being pivoted at its upper end to a depending flange of the key plate 3.

A spring 73 is coiled about the pivot pin 70, and its ends engaged with the arms 71 and 68 so as to normally tend to separate the arms or straighten out the angle between them. A somewhat similar spring 74 may be coiled about the pivot 72 of the arm 71 and its ends engaged with the arms 71 and a depending flange of the plate 3, so as to normally urge the arm 71 in a direction to cause the travel of the carriage in the direction controlled by the escapement device. Either springs 73 or 74 alone will be sufficient to cause the travel of the carriage step by step under the control of the escapement device, but I have found that a more dependable and smooth action is obtained by the use of both springs. Thus as the keys are depressed, the carriage will be stepped along so as to carry the row of pins therein successively beneath the row of setting dogs 26. The operation of any key will thus set a particular pin in the particular row beneath it, and as the carriage is stepped along the pins in the successive rows may be selectively set, or depressed. In Fig. 5 one of the keys is shown as depressed for the setting of a pin.

A plurality of rack bars 75 (see Figs. 10, 13 and 16) are mounted for reciprocation forwardly and rearwardly of the base 2, suitable guiding means on the base being provided for this purpose. These racks at their forward ends are provided with arms 76 that extend forwardly, then upwardly and then transversely (see Fig. 10 and Fig. 16). A bell crank latch lever 77 is pivoted, as at 78, to each rack adjacent its forward end, and the latch nose or arm 79 of each of such levers extends slightly forwardly of the forward end of the rack for detachable engagement with a common operating bar 80. A spring 81 is connected between a tail 82 of each lever 77 and an upstanding arm 83 of the rack, so as to normally urge the latch lever 77 in a direction to engage with the common operating bar 80. The engagement of the upright arm of each latch lever 77 with the angular end of the arm 76 (Fig. 16) serves to limit the movement of the latch lever under the action of the spring 81.

The common operating bar 80 extends between and connects additional rack bars 84 (see Figs. 9, 10 and 16) that are also mounted on the base 2 for reciprocation forwardly and rearwardly of the machine. In the normal position of the machine, the rack bars 75 will all be in their retracted or rearward positions as shown in Figs. 6, 13 and 16, and the rack bars 84 will also be in their retracted or rearward positions, with the common operating bar 80 extending across beneath the forwardly extending portions of the arms 76 and with the latch arms 79 of the levers 77 engaged over the common bar 80 as shown in Figs. 6 and 16. It will be obvious that if the bar 80 is then drawn forwardly it will draw all of the rack bars 75 forwardly as long as the latch levers 77 are engaged over the common bar 80.

The upstanding arms of the latch levers 77 are in the planes of the different rows of pins which are positioned successively as the carriage is stepped along by the escapement mechanism and normally clear the unset pins of the row of pins which may be in the same plane with the latch arms or levers at any particular time. If, however, any of the pins have been selectively set or depressed, as shown in Fig. 10 for example, the upstanding arms of the latch levers 77 will engage with these depressed pins at different points in the travel of the rack bars 75, depending upon the particular pins in the corresponding row which have been depressed. The engagement of any latch lever with a set pin will cause a rocking of the latch lever against the action of the spring 81 during the continued forward movement of the common bar 80, and such continued movement will automatically unlatch the rack bars from the common bar at variable points or instants in their travel.

The set pins are normally above the range of the latch levers 77 when the carriage is in its upper position, but suitable mechanism is provided, and will be explained in detail hereinafter, for causing a lowering of the carriage to place the set stops in the paths of the latch levers during the period of forward travel of the common operating bar 80. In order to positively prevent travel of the carriage or depressing of a key while the racks are being pulled forwardly, the link 42 (see Fig. 10) which is operated by a lowering of the carriage extends beyond the lever 33, and into a position above a tail 85 (see Fig. 4 and Fig. 5) of the universal bar 64. This forwardly projecting end of the link 42, as shown in Fig. 10, is cut away, so that when this cut away portion is directly above the tail portion 85 of the universal bar, as will be the case when the carriage support is in its elevated position, it will not limit the oscillation of the tail 85 with the universal bar. When, however, the link 42 is shifted forwardly, which occurs when the carriage and its support are lowered, to place the set pins in the paths of the latch levers 79, the uncut portion of the link 42 will be carried closely above the tail 85 and will lock the latter against movement. Thus operation of the keys and travel of the carriage will be positively prevented when the carriage is in its lower position where its set stops will be effective in intercepting the travels of the rack bars 75. In order to limit the downward movement of the levers 7 and 8 and the key stems, the key plate 3 may have a projecting tongue 86 struck from a depending flange, and bent into the path of oscillation of the universal bar, as shown in Figs. 4 and 5. The engagement of the dog 55 with the ratchet wheel, however, also serves to limit the downward movement of each key stem.

The two racks 84 which carry the common operating bar 80, mesh with gears 87, (see Figs. 9 and 14) which are fixed upon a shaft 88 that extends across the frame 1 and is mounted for rotation therein. A pinion 89 is connected to the gear 87 for rotation therewith. A main drive or operating shaft 90 also extends transversely across the machine and is mounted for oscillation in the frame, one end of the shaft being extended exteriorly of the frame and provided with a handle 91, by which the shaft may be oscillated.

Referring now particularly to Figs. 9 and 28 to 34, a sector gear 92 (Fig. 34) is rotatably mounted upon the shaft 90 and meshes with the pinion 89. An intermediate member 93 (Fig. 29) is also rotatably mounted upon the shaft 90 and abuts face to face with the sector gear 92. An operating element 94 (Fig. 30) is keyed or otherwise secured to the shaft 90 for oscillation therewith, and in turn abuts face to face with the intermediate member 93. The intermediate member 93 has two oppositely extending end portions 95 and 96 within its own plane, as shown particularly in Fig. 29, and the sector gear 92 is provided with an angularly extending arm 97 carrying an ear 98 that projects along an edge of the intermediate member so as to engage with one side of the extension 95 thereof for a purpose which will appear shortly.

A latch lever 99 is pivoted at 100 to the arm 97 of the sector gear, so as to extend along the outer arcuate surface of the extension 95 of the intermediate member 93. The lever 99 has a nose portion which is adapted to hook over and engage with one side edge of the extension 95 when the other edge is engaged by the ear 98 of the sector gear. The latch lever 99 and the ear 98 thus serve to couple the intermediate member and the sector gear for movement together, but movement together in one direction may be interrupted by disengagement of the latch lever 99 from the extension 95. A cam plate 102 is secured upon the base 2 and presents a nose portion in the path of an angular tail of the latch lever 99, so that as the tail of the latch lever engages the cam nose during the movement of the intermediate member and sector gear together in one direction, the latch lever will be disengaged from the intermediate member in order that the latter may continue its movement in the same direction to a limited extent without carrying the sector gear with it. A spring 103 connects the nose end of the latch lever 99 with a suitable pin on the sector gear 92, so as to yieldingly urge the latch lever into latching engagement with the extension 95 of the intermediate member 93.

The operating element 94 which oscillates with the shaft 90 is provided with an angular flange 104 which engages with one edge of the extension 96 of the intermediate member 93, so that when the shaft 90 is operated in one direction it will carry with it the intermediate member, but when the element 94 returns, it will not carry the intermediate member with it unless connected thereto by other mechanism now to be described. A latch dog 105 is pivoted at 106 to the element 94 which oscillates with the shaft and normally engages with the other edge of the extension 96 opposite from the edge which is engaged by the flange 104 so as to cause travel of the intermediate member 93 with the shaft 90 in the other direction. A spring 107 connected between the dog 105 and a suitable part of the element 94 serves to normally hold the dog in latched engagement with the end of the extension 96 as shown in Fig. 28.

Referring now particularly to Fig. 33, a cam member 108 is also rotatably mounted upon the shaft 90, and has a cam surface 109 in a position to be engaged by a tail of the latch dog 105 as the latter moves with the shaft in one direction, the point of engagement being substantially at the limit of movement of the shaft 90 in one direction, as shown in Fig. 33. The cam element 108 may be oscillated to a limited extent by a lever 110 which is pivoted at 111, and connected to one end of a repeat key stem 112 that extends upwardly through the key plate 3. A spring 113 is connected between the lever 110 and a suitable part of the frame for normally urging the key stem 112 upwardly and the cam member 108 into a retracted position, where it will be ineffective upon the latch dog 105 when the latter reaches its limit of movement with the shaft 90.

The mechanism just described operates as follows: When the handle 91 is pulled forwardly, the element 94 on the shaft 90 which oscillates therewith will draw with it the intermediate member 93 by reason of the engagement of the flange 104 with the extension 96, and the intermediate member which is latched to the sector gear by the latch lever 99 will drive the sector gear 92 with the shaft 90. The sector gear in its angular movement will drive the pinion 89 and through the latter will rotate the shaft 88, whereupon the gears 87 that are also fixed to the shaft 88 will drive the two racks 84 that carry the common operating bar 80 forwardly of the machine, and carry all of the rack bars 75 forwardly until the bars 75 are selectively released by their engagement with the set or other stops. When the shaft 90 has moved sufficiently to carry the common operating bar 80 forwardly to the maximum desired extent, the latch lever 99 will be disengaged from the intermediate member by reason of its engagement with the fixed cam 102, and thereafter the intermediate member will move with the shaft 90 and without the sector gear 92 to a further extent which is utilized for a printing operation, the details of which will be explained hereinafter.

It will be noted that the double engagement of the pawl 99 with the fixed cam 102 during the time that the pawl runs on the curved surface of the extension 95 of the intermediate member 93 will cause the gear segment 92 to be positively locked in both directions during the printing operation.

When the shaft 90 approaches its limit of movement in that forward or printing direction, a holding pawl 114, which is pivoted at 115 to the cam plate 102 will ride upon the arcuate surface 101 of the extension 95, being pressed yieldingly thereagainst by a spring 116 which is connected at one end to the pawl 114 and at its other end to a suitable pin on the cam plate, as shown clearly in Figs. 31 to 33. At the limit of movement of the shaft 90, the pawl 114 will drop into a notch 117 in the arcuate surface 101 of the intermediate member 93 and yieldingly hold the intermediate member in that position. If the repeat key stem 112 has not been depressed, the cam surface 109 of the cam member 108 will be in a position where it will not be engaged by the latch dog 105, as shown in Fig. 33.

When the shaft 90 starts upon its return movement, the latch dog 105 which remains engaged with the extension 96 of the intermediate member 93 will cause a return movement of the intermediate member, and when the parts have returned to the position shown in Fig. 28 the extension 95 will engage with the ear 98 of the sector gear and operate the latter in a direction to return the common bar 80 to its retracted or rearward position, during which it will engage and return to normal or rearward position all of the rack bars 75. If, however, at the beginning of the return stroke, the repeat key stem 112 was depressed as shown in Fig. 33, the cam surface 109 was in a position where it disengaged the latch dog 105 from the intermediate member 93, as shown in Fig. 33, and hence, there will be no driving connection between the driving element 94 that moves with the shaft 90 and the intermediate member.

The operating element 94 will thus return with the shaft 90, leaving the intermediate member 93 and the sector gear 92 in the positions into which they have been moved as shown in Fig. 33, the returned position being shown in Fig. 32. The handle 91 may then be operated through a similar cycle in order to cause repeated printing of the characters set up, as will be explained hereinafter. When the repeat key stem 112 is released the latch dog 105 will reengage with the intermediate member at the next forward movement of the handle 91, and will then cause a return of all the parts to normal positions upon the return movement of the handle 91. The returned positions of the parts just described are shown in Fig. 9.

Referring now particularly to Figs. 7 to 11 inclusive, a shaft 118 extends across the frame and pivotally supports for oscillation, a printing frame 119. The frame 119 is provided with a shaft 120 that extends parallel to the shaft 118, but at one side thereof, and rotatably supports a plurality of character bearing type or dial wheels 121 that are shown more particularly in Fig. 3 and Fig. 35. Each dial wheel 121 is provided with an attached gear 122 as shown clearly in Fig. 35, by which it may be angularly or rotatably adjusted in order to present any of the various printing type or characters provided upon its peripheral surface in printing or set up position.

Each gear 122 of a dial wheel (see Fig. 6) meshes with an individual gear 123 that is rotatably mounted upon the shaft 118. Each gear 123 in turn meshes with an individual gear 124 that is rotatably mounted upon the shaft 88, and each gear 124 meshes with a rack bar 75 by which it may be operated. Thus as the rack bars 75 are drawn forwardly to various extents depending upon the points of disengagement caused by the selectively settable pins or other stops of the carriage, the dial wheels 121 will be selectively adjusted so as to present characters or type provided thereon in particular combinations, determined by the particular setting of the pins. The dial wheels 121 are arranged in groups (see Fig. 35) which are separated from one another in order that the dollars and cents may be spaced apart in printing, and also to provide a space in which a dollar character or logotype 125 may be interposed for printing purposes.

In view of the fact that the rack bars must be so grouped together that the carriage with the settable stops may move entirely across the same and through at least a distance approximately double the width of the space occupied by the group of rack bars 75, the rack bars 75 are placed somewhat closely to one another as shown in Figs. 13 and 14, but it is not desirable to have the dial wheels as closely spaced although it is desirable to have dial wheels of such width that broad characters or type to be printed may be provided thereon. Therefore, additional racks 75$^a$ are provided at the sides of the group of bars 75, and have no latch pawls for engaging the common operating bar 80. These extra rack bars 75$^a$ are coupled to certain of the rack bars 75 by connectors 126 (see Figs. 13 and 14) which cause movement of the extra rack bars with selected ones of the group of rack bars 75 and it is with these racks 75$^a$, instead of the racks 75 to which they are connected that certain of the gears 124 mesh.

To obtain proper spacing of the wheels it is desirable to place some of the extra rack bars such as those for the cents dial at one side of the rack bar 84 which propels the common bar 80 as will be observed from Fig. 13. Certain of the gears 124 will be made double, as shown in Fig. 14, so that the gears 123 and the rack bars which drive them may be in different planes in order to obtain the desired space between the gears 123 that mesh with the dial or character bearing wheels. The casing or frame of the machine is provided at a point rearwardly of the character bearing wheels with a suitable guide or support, having a slot 127 for receiving and supporting checks or other small forms in printing position, the support having an aperture 128 in a wall of the seat through which printing may be effected in a manner to be explained presently.

After the dial wheels have been adjusted by appropriate movements of the controlling racks 75, the printing frame 119 supporting the shaft on which the dial wheels are mounted, is lowered in a manner to be described hereinafter, so as to carry the dial wheels into position for printing through the aperture 128, as shown in Fig. 11. During this movement, if the gears 123 remain stationary, the dial wheels will have a planetary movement about the shaft 118 and will be further rotated during said movement, but inasmuch as the movement of the printing frame will be uniform in each case, all of the dial wheels will always have the same angular movement about their axes while moving into printing position at the aperture 128. The characters, therefore, are so placed upon the wheels 121 that when adjusted by the rack bars to present any particular combination for printing, such combination of characters will be shifted into printing position opposite the aperture 128, by the swinging movement of the printing frame from the position shown in Fig. 6 to the position shown in Fig. 11.

Referring now particularly to Fig. 7, a lever 129 is pivoted at 130 for oscillation about an axis parallel to the shaft 118. One arm of the lever 129 is connected by a link 131 to the printing frame 119 and another arm of the lever is provided with a cam roller or follower 132 which is adapted to ride upon the periphery of a cam 133 that is fixed upon the main drive or operating shaft 90. The normal position of the parts is shown in Fig. 7, at which time the follower 132 is riding upon a dwell portion of the cam surface of the cam 133. Springs 134 (see Figs. 3 and 7) are connected between the printing frame and studs 44 on the machine frame for yieldingly holding the printing frame in its upper position and with the cam roller 132 riding upon the cam 133.

During the operation of the shaft 90 by the handle 91 the cam 133 will move therewith and the dwell portion of the cam surface of the cam 133 is such as to cause no movement of the lever 129 until the shaft 90 has reached a position such as shown in Fig. 28, which is the point at which the common operating bar 80 for the racks 75 has reached its forward limit of movement. Thereupon the cam roller 132 will ride up the high part of the cam 133 during a continuance of the rotation of the shaft 90 in the same direction, with the result that the lever 129 will be shifted positively in a direction to pull the printing frame downwardly into printing position, as shown in Fig. 11 and hold it in that position while the cam 133 continues to move in the same direction.

The cam roller 132 will ride upon the high part of the cam without further movement of the printing frame during which an operation of the printing platen in a manner to be subsequently explained will occur. During the return movement of the shaft 90 the cam roller 132 will enter the dwell portion of the surface of cam 133 and the springs 134 will elevate the printing frame to the normal position shown in Fig. 7. If, however, the printing frame should stick, or the springs 134 are unable to elevate the printing frame, a cam pin or roller 135 upon the cam 133 will contact with a depending arm 136 of the lever 129 and positively elevate the printing frame at the last portion of the return movement of the shaft 90.

In order to provide for a limited adjustment of the printing frame 119, the connection between the link 131 and the frame 119 includes a shaft 131ª (Fig. 7 and Fig. 35) having an eccentric portion 131ᶜ receiving the links 131, so that by rotation of the shaft the frame may be adjusted to a slight extent relatively to the lever 129. A screw 131ᵇ may be threaded into an end of the shaft 131ª so that the shaft may be clamped in adjusted positions.

Referring now particularly to Figs. 3, 6 and 10 it will be noted that while the rack bars 75 are released from the common operating bar 80, the latch levers 77 will be stressed by the springs 81 and therefore, unless the rack bars are locked in the positions in which they are dropped or released from the bar 80, the springs 81 will act upon the latch levers 77, rotate them about their points of contacts with the stops as fulcrums, and shift the rack bars rearwardly to uncertain extents. Accordingly, I may provide a plurality of rebound dogs 137 upon a rod or shaft 138 that extends across the frame adjacent the gear wheels 123, the dogs being individually rotatable upon the rod or shaft 138.

The dogs are individually rotatable into engagement with the teeth of the gear wheels 123, being yieldingly stressed toward the gear wheels by springs 139 which are connected between the rebound dogs and tongues 140 that are struck out from the cross bar of a bail 141 whose arms are rotatably mounted upon the shaft 138. The rebound dogs 137 are provided with projections 137ª (Fig. 6) which extend into the openings formed as the tongues or prongs are struck out to form means of attachment for the springs 139, so that when the bail 141 is rocked upwardly, it will engage the prongs or projections 137ª of all of the rebound dogs and shift them out of engagement with the gear wheels 123 during a resetting movement that will be subsequently herein explained.

The bail 141 which controls the rebound dogs is provided at one end with an upstanding arm 142, (Figs. 7, 9, 10 and 17) having a slot 143. One wall of the slot is provided with a shoulder 144. A detent 145 is pivoted upon a shaft 270 and carries at one end an angular detent nose 146 that extends into the slot 143 and bears upon the wall of the slot having the shoulder 144. This detent 145 is shown clearly in Figs. 10 and 17, and is yieldingly urged in a direction to hold its angular end or nose 146 in contact with the shouldered wall of the arm 142 by a spring 147 which is connected between a tail of the detent 145 and the arm 142. This spring 147 thus serves the double function of holding the detent in contact with the shouldered wall of the slot in the arm 142, and also of yieldingly urging the arm 142 in a direction to elevate the cross bar of the bail 141 when the detent is elevated out of engagement with the shoulder 144. When the detent 145 is latched against the shoulder 144, as shown in Figs. 7 and 9, the cross bar of the bail 141 will be lowered so as to release the rebound dogs and allow their yielding and individual engagement with the gears 123. When the detent 145 is elevated to release the arm 142 the spring 147 will rock the arm 142, elevate the cross bar or bail 141, and retract all of the rebound dogs from engagement with the gears 123.

Figure 17:
Fig. 17 is an elevation of a number of related elements and illustrating certain details of the rebound dog control.

Referring now particularly to Figs. 9, 14 and 17, a gear 148 is rotatably mounted upon the shaft 118 carrying the gears 123, and meshes with one of the gears 87, such as the one which has the pinion 89 attached thereto, as shown particularly in Fig. 14. The gear 148 carries a cam element 149 (see Figs. 14 and 17) having two radially extending arms angularly spaced apart about the axis of the shaft 118, which arms in moving may engage with a tail 150 on the detent 145 so as to rock the detent in a direction to release the arm 142.

Referring now particularly to Fig. 9 which shows the relative position of the parts before any operation is started, it will be observed that one of the arms of the cam 149 is in engagement with a projection 151 on the arm 142, so as to hold the arm 142 in a position where the rebound dogs are free to engage the gear wheels 123. During the setting up of the combination of characters to be printed, the gear 87 will be rotated during the forward movement of the common actuating bar for the setting up racks, and thus the gear 148 will also rotate and carry an arm of the cam 149 out of engagement with the projection 151, whereupon the spring 147 will shift the arm 142 until the shoulder 144 engages the detent 145.

This slight movement is provided in order that the detent nose 146 will have sufficient clearance in moving into latching position before the shoulders. Just prior to the completion of the setting-up stroke of the main shaft 90 and during the printing operation, the other arm of the cam 149 will engage with the tail 150 of the detent 145 and rock it in a direction to release the arm 142, whereupon the spring 147 will rock the common bail 141 in a direction to remove all of the rebound dogs from engagement with the gears 123, there being no danger in so releasing these gears because they are locked against movement during the printing operation by the other means which will be presently described. The released position of the arm 142 is shown in Fig. 17.

Referring now particularly to Figs. 8, 9 and 14, a cam disc 152 (Fig. 14) is secured, such as by studs 153, to one face of the gear 148 for rotation therewith. The shaft 88 (Fig. 14 particularly) also mounts a gear wheel 154 for rotation therewith, and this gear meshes with and drives another gear 155 upon the shaft 118. The gear 155 carries a cam disc 156 which is similar to the cam disc 152, the disc 156 being mounted upon the gear 155 in any suitable manner such as by studs 157 which are carried by the gear in a manner to project from the face thereof, and extend through and mount the cam disc. The cam discs 152 and 156 are provided in their periphery with angularly spaced notches or depressions 158 and 159 (see Figs. 8 and 9 particularly).

A bail 160 (Figs. 3 and 8) is rotatably supported by its arms upon the shaft 138 (see Figs. 6 to 11) with the cross arm portion 161 extending along the row of gears 123 for engagement between the teeth of the gears when the bail is rocked into contact with the same. A spring 162 (Figs. 8 and 9) is connected between an arm 163 of the bail 160 and a suitable point of the depending flange of plate 3 for yieldingly urging the bail in a direction to engage and lock the gears 123 against rotation. The arms of the bail 160 are provided with rollers 164 which ride upon the cam discs 152 and 156, and while the rollers are running upon the peripheral surfaces of the discs, the cross portion of the bail, which serves as a universal locking bar or dog, will be held clear of the gears 123.

During the setting up operation caused by the forward movement of the rack bars 75, the cam discs 152 and 156 will be rotated, owing to their driving relation to the rack bars 84, and hence the depressions 158 will be carried into alignment with the rollers 164 at the end of the setting up motion, that is at the end of the forward stroke of the common operating cross bar 80, and at the beginning of the portion of the handle stroke during which printing occurs. It will be remembered that the rack bars are all stationary during the printing operation, because of the fact that the main driving sector (see Figs. 28 to 33) has been disconnected from the main driving shaft.

As the notches or depressions 158 move into alignment with the rollers 164, the latter will be snapped into the notches by the spring 162, and the cross arm 161 will snap in between the teeth of the gears 123 and lock them securely against displacement during the printing operations. The edge of the cross bar which enters the space between the gears 123 may be made somewhat tapered so as to assist in centering the gears 123 if they should be slightly out of positions to receive the locking bar. This locking bar arm 161 while in engagement with the gears 123 will hold the latter against movement while the printing frame is lowered into printing position as hereinbefore explained.

Inasmuch as a printing operation is undesirable when the characters or type upon the dial wheels are not in perfect alignment, the common locking bail 160 is utilized to prevent operation of the printing mechanism when it is out of locking position, as shown in Fig. 6 for example. Accordingly the tail portion 163 of the bail 160 (Fig. 8) is provided with a slot 165 for receiving a pin 166 on a locking dog 167 that is hinged upon a rod 168 (see Figs. 3, 15 and 21) carried by the frame.

This locking dog 167 has a lateral extension 169, (see Fig. 21) that extends through an aperture 170 in the frame and into the path of travel of an an abutment flange or lug 171 (see Fig. 21) provided upon the handle 91.

When the lateral projection 169 is in its lower position as shown in Figs. 6 and 21, it will lie in the path of travel of the flange or lug 171 of the handle, and will lock the handle 91 against movement beyond the setting up arc of movement. If, now the locking bail 160 is in engagement with the gears 123, as shown in Fig. 11, then the locking dog 167 will be in its elevated position, as shown in Fig. 11, and the lateral extension 169 thereof will be out of the path of travel of the lug 171 of the handle 91 so as to allow continued movement of the handle 91 for printing purposes.

Suitable means must be provided for inking the type characters that are placed in printing position, and for that purpose any suitable inking means may be employed. For example the inking mechanism shown in U. S. Patent 1,372,323 issued March 22, 1921, may be employed. In the particular form applied to this machine, the inking means is supported in a frame 172 (see Figs. 6, to 9 and 11) which is removably supported in the machine frame 1 in any suitable manner, such as by providing cooperating guiding means between the machine frame and the frame 172 enabling the lowering of the frame 172 into the machine frame from the top. A suitable locking detent 173 may be pivoted to each side of the machine frame so as to be movable into locking engagement with notches 174 of the inking frame when the latter has been inserted in proper position, as shown in Figs. 6 and 9 for example. The locking detents 173 preferably have tail portions engaged by the cover of the casing when the latter is applied, so that the movement of the cover into closed position will force the detents 173 into locking position as shown in Figs. 6 and 9.

A series of ink carrying rollers 175 are mounted upon a rod 175ª that extends between arms 175ᵇ. The arms 175ᵇ are hinged at 175ᶜ to the frame 172 and are limited in their downward movement by their engagement with a rod 175ᵈ of the inking frame 172. The rollers 175 are spaced slightly apart across the frame as shown in Fig. 14, so that each roller can have different colors of ink, if desired, without contact or mixing with one another. A subinking frame 176 is pivotally supported at 176ª in the inking frame 172 below the inking rollers 175 and this sub-frame in turn carries individual inking rollers 177 which are capable of contacting with and slightly elevating the corresponding rollers 175 when the subframe is in its upper position, as shown in Figs. 6 and 9 for example. When the sub-inking frame 176 is lowered, its individual inking rollers 177 will drop into contact with the peripheries of the dial wheels 121 and as the dial wheels rotate in moving into printing position by the lowering of the printing frame 119, the rolling action between the dial wheels and the inking rollers 177 will cause the transfer of ink between the rollers and the dial wheels at the points bearing the characters to be printed.

The frame 176 may be limited in its downward movement by pins 176ᵇ. The subinking frame 176 is normally held in its elevated position by arms 178 located and engaging at the sides of the machine frame beneath lateral ears 179 of the sub-inking frame, the arms 178 being rotatably mounted upon the shaft 270 (see Figs. 6 to 11, 14 and 17). The arms 178 have somewhat U-shaped portions where pivoted upon the shaft 270, as shown particularly in Fig. 14, one branch of the U-portion of each arm 178 being extended angularly of the shaft 270 as shown in Fig. 8. This angular portion 179 of each arm 178 carries a cam roller 180 which also rides upon the periphery of cam disc 152 or 156, that is, one arm 178 is supported by the contact of the roller 180 with the periphery of the cam disc 152, and the other arm 178 is supported by contact of its rollers 180 with the other cam disc 156 (see Fig. 14). The rollers 180 are adapted to drop into the notch or depression 159 of the cam discs as the notch moves into alignment therewith, and in so dropping will lower the inking rollers 177 into contact with the dial wheels.

Inasmuch as the setting up operation is not yet complete in every instance when the first notch 158 of each disc moves into alignment with a roller 180, it is unnecessary to allow the inking rolls to drop at that time. Accordingly, I may provide upon each cam disc 152 or 156, a cam pin 181 (see Fig. 9) which is adapted to engage with a portion of the angular extension 179 that is disposed against the face of the cam disc, as shown in Figs. 8 and 9. That is, the cam pin 181 on each cam disc 152 or 156 will move in close proximity to an arcuate surface 182 on the angular portion 179 of each supporting arm 178, and the cam pins 181 are so located adjacent the notches 158 that when the latter are in alignment with the rollers 180, the cam pins 181 will be beneath and in proximity to the arcuate surfaces 182 to support the arms 178 and prevent material lowering of the subprinting frame. When the second notch 159 of each cam disc, however, moves into alignment with the corresponding roller 180, the inking frame will be free to drop into contact with the dial wheels at the completion of the setting up movement produced by the operating handle. In order to assist the action of gravity in holding the arms 175ᵇ in lower position, a spring 183 (see Figs. 6, 8 and 11 for example) may be coiled about the rod 175ᶜ, with one end bearing upon a pin of an arm 175ᵇ, and with the other end anchored against the relatively stationary rod 176ª.

Referring now particularly to Figs. 8, 11 and 12, the main operating shaft 90 which is operated by the handle 91 is also provided with a plate 184 which is keyed thereto for rotation therewith. The sector members 185 and 186 are rotatable upon the shaft 90 and may be identical except that one of them, such as 185 is provided upon an arcuate peripheral portion carrying gear teeth 187 (see Fig. 8 and Fig. 12) and provided with corresponding tail portions or arms 188. A latch lever 189 is pivoted to the tail pieces or arms 188 of the sector member, by means of a pin 190 as shown in Fig. 12.

The plate 184, which rotates with the shaft 90, is provided with a locking edge 191 with which the lever 189 may engage. The peripheral surface of the plate 184 immediately adjacent the edge 191 is arcuate, with a center of curvature at the axis of the shaft 90, and the nose of the latch lever 189 is adapted to ride upon this arcuate surface of the plate 184 until it snaps over the edge 191 under the influence of a spring 192 which is connected between the latch lever 189 and a pin 193 on the sector member 186. A pin 194 is provided upon the plate 184 so as to be in the path of the angular arm or tail portion 188 of the sector member 186 and an edge of the body of the sector as shown in Fig. 8 and Fig. 11. Thus when the shaft 90 is operated during a setting up movement, that is, a movement in which the dial wheels are set selectively for printing purposes, the pin 194 will move with the plate 184 and the shaft 90 from the relative positions shown in Fig. 8 in a clockwise direction, until it engages with the arm 188 of the sector member, this idle movement being such that engagement with the arm 188 of the sector member occurs at about the instant that the adjustment of the dials is complete, and the printing operation is to start. At the time that the pin 194 engages the arm 188, the latch lever 189 will be free to snap into latching engagement with the edge 191 of the plate 184. Further movement of the shaft 90 for causing a printing operation will rock the sector members 185 and 186 through the remainder of the printing stroke.

A link 195 (Figs. 8, 11 and 12) is pivoted at one end by a pin 196 between the sector members 185 and 186, and extends rearwardly of the machine, its other end being pivotally connected by a pin 197 to the depending long tail arm of a yoke 198 (see also Fig. 3) that is in turn, pivoted upon a rod 199 extending across the rear part of the machine frame. The yoke 198 adjacent its ends is pivotally connected by pins 200 to other links 201, and the other ends of these links are in turn connected by pivot pins 202 to arms of levers 203 which are pivoted upon a shaft rod 204. The levers 203 are in turn pivotally connected by pins 205 to links 206, and the latter are in turn pivoted by pins 207 to tail portions 208 of a platen yoke 209 that is mounted for reciprocation forwardly and rearwardly, and immediately in the rear of the slot 127 in which the small form to be printed upon is inserted. That is, the platen bar 210 will be aligned with the opening 128 through which the set up type characters will be exposed for printing. The platen yoke 209 may have a tail portion 208ª (see Figs 3 and 6) that terminates at its rear or free end in a fork, the arms of which embrace and slide upon the shaft rod 204 and guide the platen in its reciprocations.

The platen yoke 209 is provided with a platen bar 210 extending forwardly therefrom and slidable in a slot that extends lengthwise of the platen yoke from side to side of the machine. This platen bar may be suitably cut with grooves or cross cuts, corresponding to those of the dial wheels. Suitable adjusting screws 211 pass through the platen yoke and engage with the platen bar. Some of the screws are rotatable in the platen yoke and are threaded into the platen bar so as to draw the bar back and forth, and others of the screws are threaded into the platen yoke and bear upon such surface of the platen bar, so as to enable adjustment of the platen bar in the yoke. Thus, by adjustment, of the screws 211, the platen bar 210 of the yoke may be shifted in the slot of the yoke in order to contact uniformly with all of the set up type upon the dial wheels. When the sector members 185 and 186 are rocked from the position shown in Fig. 8 to the position shown in Fig. 11, the movement will be transferred to the links 195, yoke lever 198 links 201, levers 203 and links 206 to the platen to shift it forwardly and press the small form to be printed upon firmly against the dial wheels as shown in Fig. 11. The wall of the machine defining the slot 127 for receiving and supporting the paper form to be printed upon may have an aperture 212 in which the platen bar of the platen is slidingly supported and guided and always in alignment with the opening 128 through which the dial wheels and type are exposed.

The platen presses the small form into contact with the dial wheels firmly at the end of the forward movement of the handle 91, and at the beginning of the return stroke of the operating handle 91, the platen will be retracted owing to the fact that the latch lever 189 is then coupled or hooked over the edge 191 of the plate 184. When the handle 91 reaches the intermediate position on its return movement at which the printing operation was started while at that point on the forward stroke, a tail portion of the latch lever 189 strikes a cam 213 which disengages the latch lever from the plate 184 and permits continued movement of the plate 184 and the shaft 90 back to original position as shown in Fig. 8. During this last mentioned movement, the latch lever will bear upon the arcuate surface of the plate 184 which leads from the edge 191 with which it formerly was engaged. At this time the latch lever 189 by reason of its double engagement with the fixed cam plate 213 is locked in both directions and thus locks the platen and the printing frame 119.

The teeth 187 of the sector member 185 mesh with and drive a carriage return pinion 214 (Fig. 12 and Fig. 8) which is fixed upon a shaft 215 (see Fig. 27 also), the latter being rotatably supported in and extending across the machine in a direction from side to side and adjacent the carriage support 32. This shaft 215 is provided with a spiral cam 216 which extends less than a complete revolution, that is, less than entirely around the shaft, so as to leave a clearance space 217 (see Figs. 6 and 9). A cam roller 218 is carried by an arm 219 that extends rearwardly from the carriage 47 and along the side of the cam 216 so as to cooperate therewith. The ratio of gearing between the shaft 90 and the carriage return shaft 215 is such as to give the carriage return shaft and thus the return cam 216 approximately, but preferably not quite, a single revolution at each stroke of the handle 91.

The length of the cam 216 (see Fig. 27) is approximately equal to or greater than the travel of the carriage, so that regardless of which position in its travel the carriage may be at any time, the cam 216 will, by approximately a single rotation during the printing operation, pick up the cam follower 218 and force it in a direction to return the carriage to initial position and also slightly further for a purpose to be explained hereinafter. The reverse rotation of the cam 216 during the return movement of the operating handle 91 will have no effect upon the carriage or roller since the carriage was shifted completely back to initial position or beyond the end of the cam during the forward stroke of the handle 91. The pivot pin 70 (see Figs. 4, 5, 6 and 9) may extend through a slot 220 (see Fig. 6) in the frame or casing of the machine at its forward end, and terminates in an operating button 221 by which the carriage may be manually returned to initial position whenever desired.

Figure 18:
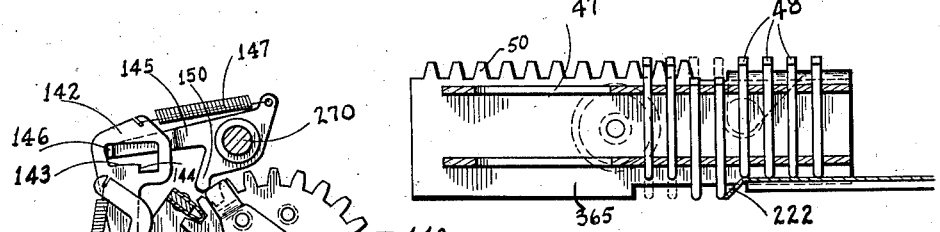
Fig. 18 is a sectional elevation through the carriage and illustrating the method of returning the set stops or pins to normal position.

During the return movement of the carriage, whether by the action of the cam 216 or by manual operation through the button 221, the successive rows of pins which may be set or depressed will engage with an inclined cam surface 222 (see Figs. 16 and 18), disposed beneath and supported by the carriage support. Any set pins engaging with such inclined cam will be forced upwardly, as shown in Fig. 18, into normal position as the carriage returns to normal or initial position. The inclined cam 222 is disposed at a point to be engaged by any set pins that are beyond the first row of pins when the carriage is in its normal starting position shown in Fig 16.

For resetting of all the pins in all the rows, the carriage must be returned at least one additional step beyond the desired starting position, to reset all pins by the cam surface 222, and then moved forwardly again at least one step, in order to carry the first row of pins clear of the inclined cam surface 222, that any of the pins in said first row may be depressed without obstruction from the cam surface when the keys are operated. Therefore, the escapement wheel 54 (see Figs. 4, 5 and 40) is provided with a cam lug 223 which is so positioned upon the wheel that it will engage with a projection 224 provided upon the dog 56 of the escapement mechanism, and cam it out of engagement with the ratchet wheel just as the carriage reaches the limit of its return movement sufficient to reset all of the pins by the cam surface 222 (see Fig. 40). Then when the carriage is released, either by releasing the button 221 by which it is manually returned, or by movement of the cam 216 into the position shown in Fig. 9 where it clears the roller 218, the carriage will be shifted in a feeding direction by the action of the springs 73 and 74 until the cam lug 223 moves out of engagement with the projection 224 of the escapement dog 56 and permits reengagement of the latter with the ratchet wheel to hold the carriage in that position. This arrangement allows the return of the carriage for at least one step in its movement so as to carry the first row of pins free of the inclined cam surface 222, so that they may be selectively set by the operation of the keys as hereinbefore described.

Referring now particularly to Figs. 21 to 23, suitable mechanism has been provided for preventing incomplete operation of the main operating handle 91 and constituting what may be termed full or partial stroke mechanism. A plate 224 is secured to one side of the machine and adjacent the path of travel of the handle 91. This plate 224 is provided with an arcuate surface 225 having adjacent its end portions ratchet teeth 226 and 227, those at one end of the plate being designated by the character 226, and those at the other end by the character 227. Between the two end portions I may provide also a notched portion 228 for a purpose which will appear presently. The center of curvature of the arcuate surface 225 is substantially at the axis of the shaft 90.

A pair of full stroke pawls 229 and 230 are pivotally mounted upon the handle 91, spaced apart in the direction of its travel, and disposed in positions to engage with the arcuate surface 225 of the plate 224. A lever 231 is rotatably mounted upon the pivot pin 232 of the pawl 229, extends toward the pivot of the other pawl 230, and is provided with a laterally extending tongue or ear 233 which engages with a radially extending slot 234 in the pawl 230. The lever 231 is also provided with a laterally extending ear 235 in a position to be engaged by the pawl 229 when the latter is in one angular position as shown in Fig. 23. Springs 236 and 237 are connected respectively to the pawls 229 and 230 and also to the handle 91 so as yieldingly to urge the pawls into contact with the arcuate surface 225 and the ratchet teeth 226 and 227 of that surface. The notched portion 228 is sufficiently deep to clear the pawls 229 and 230 as they move through that section of the arcuate surface.

The handle 91 is shown in its normal or inactive position in Fig. 21, and at that time the pawl 229 will be beyond the rear end of the plate 224 so as to be projecting radially of the shaft 90, and the other pawl 230 will be in contact with the ratchet teeth 227 and making such an angle to the latter that movement in one direction only, to wit, forwardly, can be given the handle 91. If now the handle 91 is pulled forwardly it cannot be returned after a partial slight forward movement, because of the pawl 230, and before the pawl 230 drops into the notch 228, the arm 91 would have moved forwardly sufficiently to carry the pawl 229 into contact with the ratchet teeth 227 and at such an angle or inclination to the arcuate surface that the forward movement of the handle must be continued.

When this movement is continued until the pawl 229 has dropped into the notch 228, the handle 91 will be at an intermediate point in its operation where the setting up has been completed, and the printing operation has not yet started. At this point if desired, the handle may be returned to the rearmost or normal position, since both pawls 229 and 230 are then in the notch 228 and at the beginning of the return movement from this intermediate position the pawl 229 will be cammed into an oppositely inclined position, similar to that shown in Fig. 23 and will engage the ratchet teeth 227 in the opposite direction so as to prevent forward movement again after the rearward movement to normal position has started, until after the handle has again reached the normal position shown in Fig. 21, at which time the pawl 229 clears the end of the plate 224 and assumes the position shown in Fig. 21.

If, however, as is expected in the normal operation of the machine, the handle 91 is moved further forwardly from the intermediate position for a printing operation, instead of being returned to normal position after a half stroke, the pawls 230 will first engage with the ratchet teeth 226 and then the pawl 229 will also engage therewith at such inclinations as to force movement of the handle 91 only in a forward direction until it reaches its extreme forward position, as shown by dash lines in Fig. 21, at which time the pawl 229 will clear the forward end of the plate 224 and snap into its position radially of the shaft 90. The handle 91 may now be started upon its return stroke, and during the return stroke the pawl 229 will immediately engage with the ratchet teeth 226 at an opposite inclination to that which it occupied during its forward stroke, such as shown in Fig. 23, for example, and will prevent further forward movement until the handle reaches the intermediate position in which the pawl 229 may snap upwardly into the notch 228.

During return movement of the handle, whether in the return from the first partial movement as hereinbefore described, or in the first portion of the complete return stroke as just explained, it will be noted that the pawl 229 while in the inclined position shown in Fig. 23 will be in engagement with the ear 235 of the lever 231 and will have rocked the lever 231 in a direction to retract the pawl 230 clear of the ratchet teeth, so that during any portion of the complete return stroke of the handle 91 only the pawl 229 will be effective upon the ratchet 226 or 227. When the handle reaches the middle position the pawls will release it so that it may again move forwardly for a second printing operation or completely return to normal position as desired. Suitable adjustable stop screws 238 (see Fig. 21) may be provided upon the base in a position to be engaged by the handle 91, so as to adjustably limit its extreme forward and rearward movements.

Referring particularly to Figs. 7 and 10, the mechanism for lowering the carriage after the pins have been set in order to place said pins in the paths of the rack bars will now be described. A cam disc 239 (see Figs. 3, 7 and 14 particularly) is secured, such as by studs 240, to the cam disc 152 for rotation therewith during operation of the main operating handle 91. A lever 241 is rotatably mounted upon the shaft 138 and carries a roller 242 which rides upon the periphery of the cam 239. A spring 243 is connected between the lever 241 and a tail portion 244 of another latch lever 245 which is pivotally connected to one of the levers 34, preferably at the same pivot pin which connects the link 42 to the upstanding arm 40 of the lever 34. The lever 245 extends over an angular end 246 of the lever 241 so as to normally rest upon the same, the portion of the surface or edge of the lever 245 which rests upon the angular end 246 being stepped so as to provide two supporting sections 247 and 248 which are separated by a shoulder 249.

The lever 245 has a flange portion 250 which extends along one face of a cam disc

251 that is fixed upon the carriage return shaft 215. The lower edge of the flange 250 is provided with an arcuate section 252 which is adapted to be engaged by a cam pin 253, that is carried by and projects from a face of the cam disc 251, along which the flange 250 extends somewhat. A cam roller 254 on a depending arm of the lever 34 to which the lever 245 is connected runs upon the peripheral surface of the cam disc 251, the periphery of the cam disc 251 having a dwell portion 255 into which the roller 254 may drop. The normal or initial positions of the parts just described are shown in Fig. 7, in which condition the carriage support is in its elevated position, and the smaller end of the lever 245, that is, its surface edge 248 is resting upon the angular end 246 of the lever 241, and the roller 242 of that lever 241 is aligned with the dwell of the periphery of the cam disc 239.

At the very beginning of movement of the handle 91 after the pins have been set up, the cam disc 239 will immediately rock the lever 241 counterclockwise (Fig. 7) and by the engagement of the angular end 246 with the shoulder 249 of the lever 245, the latter will be shifted endwise and because of its connection to the lever 34, it will cause a lowering of the carriage support. The carriage will be held in this lower position by the running of the roller 242 upon the circular portion of the cam disc 239 during the remainder of the forward movement of the operating handle 91, except for the control exercised thereon by the cam pin 253, which during the operation of the carriage return shaft in the last part of the forward handle movement and during the printing operation, will elevate the lever 245 so as to unlatch it from the angular end 246. At such unlatching the springs 43 act through the links connecting the levers of the elevating mechanism, to elevate the carriage and shift the latch lever 245 endwise with its wider or edge portion 247 resting upon the angular end 246 of the lever 241.

The pin 253 on the carriage elevating cam 251 is so positioned as to release the carriage for elevation at the beginning of the carriage return operation. In the event that the carriage is not elevated promptly by the springs 43 as soon as released, the cam roller 254 on one of the levers 34, which has moved into the dwell 255 of the cam 251 when the carriage was lowered, will be forced outwardly as the high portion of the cam passes under the roller 254, and thus the carriage support will be positively elevated if the springs 43 are ineffective for that purpose.

The arcuate edge 252 of the latch lever 245 provides for contact with the cam pin 253 during an angular movement of the carriage return cam sufficient to enable positive operation of the carriage support by the peripheral portion of the cam 251. When the handle 91 returns completely to its normal or initial position, the roller 242 of the lever 241 will drop into the dwell of the cam discs 239 and the angular end 246 of that lever 241 will slide along the edge portion 247 of the latch lever 245 until it passes the shoulder 249, whereupon the lever 245 will be rocked downwardly by the spring 243, and the parts will be reset in the positions shown in Fig. 7 for another operation.

The carriage is provided with a number of rows of pins depending upon the maximum number of characters to be set up and printed in combination, that is, upon the number of dial wheels to be adjusted into different combinations. If only one key is operated, it will, of course, only set a pin in the first row of pins, which row will be stepped along by the escapement mechanism of the carriage as the result of the operation of the key to set a pin, so as to present its set stop in the path of travel of the latch lever 77 of the units of cents rack 75, but if several keys are operated successively before the handle 91 is operated, the carriage will be stepped along and will automatically set itself to run in the proper number of characters, such as to properly separate the dollars and cents merely by the writing of the dollars and cents in numerical sequence from the highest to the lowest digit in the number to be set up. In order to prevent the subsequent addition, by unauthorized persons, of extra figures before the amount set up in order to raise the amount payable of the check or note, it is desirable and customary to insert before the highest number set up a logotype which is to be printed with the amount payable. Such a logotype may, for example, consist of the word "exactly", and it must be shifted automatically into position for printing. Accordingly, all of the dollar dial wheels are provided between the "zeros" and "nines" on those wheels with slots 256 (see Fig. 6) forming grooves through which a logotype of the word "exactly" mounted upon a base 257 may slide as far as permitted by the unset dial wheels or to the units wheel of the dollar group. The base 257 of the logotype is slidingly supported upon a member 258 (see Fig. 35 and Fig. 9), which is secured to the shaft 120 for rotation therewith such as by a pin 259 which passes transversely through the member 258 and the shaft. Between the dollar and cents groups of dial wheels the dollar logotype 125 (Figs. 35 and 36) is mounted upon a member 260 which is also keyed to the shaft 120 by a pin 261. At the end of the cents group of dial wheels, still another logotype 262 bearing the letters "cts." or the word "cents" is mounted upon the supporting member 263 which likewise is pinned to the shaft 120 for oscillation therewith.

Referring particularly to Figs. 36 and 37, the member 260 may have two arms 264 and 265 which fit over the shaft 120. The arm 264 receives the locking pin 261 which passes therethrough and also through the shaft. The other arm 265 is provided with gear teeth 266, arranged circularly around the axis of shaft 120 and meshing with the teeth of a sector gear 267 which is rotatably mounted upon the shaft 118. The sector gear 267 is provided with a radial slot 268 for receiving an eccentric cam 269 which is secured to a shaft 270. This eccentric cam gives the sector gear 267 a limited movement of oscillation for adjustment purposes. During the movement of the frame 119 into printing position, the sector gear 267 will be held stationary and the shaft 120 and gear teeth 266 on the "dollar" logotype will have a planetary movement about the shaft 118, so that when the frame 119 reaches its printing position shown by the dash lines in Fig. 36, the planetary action between the shaft 120 and the sector gear 267 will have rocked the shaft 120 to such an angle that the "dollar" logotype 125, the "cents" logotype 262, and the "exactly" logotype support will have been rocked into printing position, as shown by dash lines in Fig. 36. By adjustment of the eccentric cam 269, the initial position of the shaft 120 may be varied so that when the frame is shifted into printing position, the "exactly", "dollar" and "cents" logotypes will be properly aligned for printing purposes.

The rack bars 75 must be shifted forwardly a short distance with the common operating bar 80, before they are disengaged by stops either variable or fixed as will be explained hereinafter, and therefore, the dial wheels are all provided with a blank space corresponding to the initial movement necessarily given them in a setting up operation before they can be disengaged, whether or not any stop for those bars have been set. The logotypes are not so shifted by rack bars, and therefore, the logotypes and blank nonprinting sections of the dial wheels will be disposed at different angular positions upon the shaft 120 while in their normal or initial positions. Then when a set up occurs, the dollar group of dial wheels will move into positions for receiving the "exactly" logotype when no keys for numbers to be set up in those wheels have been set but the main operating handle is being operated.

When the printing frame 119 is lowered for printing purposes, a slot 271 in the "exactly" logotype base 257 will move over into embracing relation with a tongue 272 upstanding from a carriage 273 that is slidingly supported upon cross rods 274 of the frame. The rods 274 are supported transversely of the machine, so as to guide the carriage 273 from side to side. A lever 275 (see Fig. 13 and Fig. 38) is pivoted upon a pin 276 of the base and is rockably and slidably received in an aperture 277 provided in the carriage 273, so that oscillation of the lever 275 will reciprocate the carriage. The lever 275 is provided with a tongue 278 projecting laterally therefrom and rockably received in an aperture 279 of a sliding bar 280, the latter being mounted in the base for movement forwardly and rearwardly. A spring 281 is connected by a pin 282 to the bar 280, and by pin 283 to the base 2 of the machine, so as to urge the bar 280 yieldingly in a direction to rock the lever 275 in a manner to shift the carriage 273 across the machine.

The forward end of the bar 280 is pivotally connected by a pin 284 to the depending end of a lever 285 which is pivoted on rod 130. Intermediate of its ends the lever 285 is provided with a cam roller 287 that cooperates with a periphery of a cam 288 fixed upon the main drive shaft 90. The normal position of the "exactly" logotype shifting mechanism is shown in Fig. 38 with the shaft 90 in its normal or inactive position. At this time the cam roller 287 is riding upon the high part of the cam 288. The bar 280 is held in its rearmost position with the spring 281 tensioned, and with the carriage 273 at its normal position for engagement with the "exactly" logotype base 257 when the latter is rocked into printing position.

In the initial part of the movement of the shaft 90 during which the dial wheels are selectively set in different combinations determined by the actuation of the particular keys, the cam 288 will move with the shaft clockwise (as in Fig. 38), and the roller 287 will ride upon the high part of the cam until the operating handle 91 reaches the intermediate position where the set up of the dial wheels has been completed, and the printing operation has not been started. Then during continued forward movement of the handle 91 the printing frame 119 will be lowered into printing position, and the "exactly" logotype base will move into coupled relation with the tongue 272 of the carriage 273, just prior to the completion of the downward movement of the printing frame, and at the completion of such movement the cam roller 287 will ride off the high part of the cam 288 and release the slide 280. The spring 281 will then shift the bar 280, and through it the carriage 273, in a direction to shift the "exactly" logotype into the grooves provided in the dial wheels between the "nine" and "zero" types, on those dial wheels above the units of the dollar group which have been undisturbed by the setting up operation. This shifting will continue until the logotype base engages the first dial wheel which has been set from its inactive position where it will be stopped automatically by the dial wheel as shown in Fig. 35.

It is desirable to prevent possible movement of the "exactly" logotype toward the dial wheels until a printing operation is started. Accordingly, one of the plates of the frame 119 may have an extension 119ª (Fig. 7) with an arcuate edge that is received in a groove in the under face of the "exactly" logotype, so that the logotype may swing about the axis of the shaft 120 with its support but will be held against sliding movement on its support until it is engaged with the tongue 272 by which it is shifted. The extension 119ª is of such length that it will be disengaged from the "exactly" logotype as the latter moves into engagement with the carriage by which it is shifted laterally.

During continued further movement of the shaft 90, the printing operation will take place, and the logotype of the word "exactly" will be disposed and printed immediately in front of the highest number set up in the dollar group. During the return movement of the shaft 90 after the printing operation, the platen will be shifted away from the dial wheels and logotypes, and then the cam 288 will engage the roller 287 and shift the slide 280, and through it and the lever 275, shift the carriage 273 in a direction to withdraw the exactly logotype from the dollar group of dial wheels completely into its own supporting member 258.

During the continued return movement, the printing frame 119 will be elevated so as to uncouple the carriage 273 from the logotype base 257, and the parts will be returned to their normal positions. During this last return movement if the repeat key is not set as hereinbefore explained, the common operating bar 80 will be returned to its normal or initial position, and will return all of the rack bars 75 to starting position. The resetting of the rack bars 75 and 75ª will reset the dial wheels to normal position ready for a new set up.

Referring particularly to Figs. 15 and 21, the mechanism for preventing a printing operation in the absence of a form to be printed upon in printing position will now be described. A lever 289 is pivoted at 290 so as to be shiftable to carry one end thereof across a portion of the slot or aperture 170 and into the path of movement of the locking member 167 and prevent its movement upwardly sufficiently to clear the lug 171 of the handle 91. A spring 291 connected to the lever 289 and to a suitable part of the frame serves to yieldingly urge the lever 289 in a direction to lock the locking member 167 within the path of the flange 171. A link 292 is pivoted at 293 to the lever 289, and at a point intermediate of its length is pivotally connected by a pin 294 to an arm of a lever 295 which is pivoted upon a pin 296. The other end of the link 292 extends through apertures 297 in the walls defining the slot 127 which receives and supports the forms to be printed upon.

When the form to be printed upon is disposed in printing position in the slot 127, the free end of the link 292 will engage at its end against a face of the form, so as to be held in a retracted position, and when so retracted it will hold the lever 289 in the position shown in Fig. 21, where it is out of locking engagement with the locking member 167. The lever 295 is provided with a flange 298 which extends through an aperture or open window 299 in the side wall of the casing and into the path of travel of another lug 300 provided upon the operating handle 91. The flange 298 is so located that it will be engaged by the lug 300 of the handle 91 as the latter approximately reaches its normal or inactive position, so that the final movement of the handle 91 into its normal position will rock the lever 295 and retract the link 292 from the slot 127 in order that there will be no obstruction to the insertion or removal of a form to be printed upon.

Referring particularly to Figs. 1, 2, 3, 6, 7, 19, 20, 24 and 25, the mechanism for supporting and feeding the forms to be printed upon will now be described. A pair of arms 301 extend along the sides of the frame at the rear end and are connected by a cross bar 302 so as to form a rocking bail. Additional arms 303 are secured to the cross arm 302 intermediate of its ends and extend into the rear part of the frame through apertures 304 of the housing. The arms 301 and 303 are all pivoted upon a rod 305 that extends across and through the frame, and all of the arms 301 and 303 extend forwardly across and slightly beyond the slot 127, so as to serve as a rest upon which single forms to be printed upon may be supported at a desired point in the slot for printing purposes, such a paper form 306 being shown as so supported in Figs. 24 and 25.

The outer arms 301 may have arcuate slots 307 provided therein whose center of curvature is at the axis of the rod 305. A set screw 308 may be secured to each side of the frame, with its stem passing through the slot 307 of the adjacent arm 301, so that the arms may be clamped in different angularly adjusted positions for supporting forms to be printed upon in different vertical positions in the slot 127. The arms 303 may have similar arcuate slots which are not used, so that both arms 301 and 303 may be stamped by the same dies. The frame is provided at the lower end of the slot 127 with a cylindrical chamber 309 into which the slot 127 extends substantially tangentially thereof.

A roll of material to be printed upon may be disposed in the cylindrical casing 309 after the arms 301 and 303 have been lowered such as into the positions shown in Fig. 19, the roll being shown by dash lines in Fig. 19.

Such a roll may comprise a series of connected checks, notes, or drafts, upon which the amounts payable are to be filled in successively. Such a roll, or a single strip or form when in the slot 127, will extend endwise beyond the sides of the machine so as to pass between feed rollers 310 and 311 that are mounted in driving relation to one another at opposite sides of the machine. Each feed roller 311 is rotatably mounted upon the end of a lever 312 which is pivotally mounted at 313. An angular end of each lever 312 may extend through an aperture 314 in the frame. A spring 315 connected to each lever 312 yieldingly urges it in a direction to shift its feed rollers 311 into contact with the other feed roller 310 at that side of the machine, that is, in a direction across the slot 127.

Each feed roller 310 is rotatably mounted upon a plate 316 that is secured to the frame, and carries a pinion 317 meshing with an idler pinion 318 which is also rotatably supported upon the same plate 316. A gear 319 is fixed upon a short stub shaft 320 which is rotatably mounted in the plate 316, there being such a stub shaft and gear 319 at each side of the machine, and both in alignment with one another. A shaft 321 extends across and is rotatably mounted in the frame of the machine, and at its end portions is provided with pinions 322 which are in meshing relation with the gears 319, so that when the stub shaft 320 is rotated by a button 323 secured upon its outer end, such motion will be transmitted through the shaft 321 to the other stub shaft 320.

The plates 316 are provided as supports for the feed rollers 310 and other parts, because these parts are mounted over an aperture 324 that is provided in each side of the frame in order to provide clearance for portions of the printing frame as the latter oscillates to and from printing position. Thus by the operation of the button 323, the feed rollers 310 at both sides of the machine may be positively rotated so as to feed the form to be printed upon through the slot 127.

It is desirable to have this feeding operation performed automatically, if possible, by the main operating handle of the machine. Accordingly, a ratchet wheel 325 is secured upon one of the stub shafts 320, such as upon the stub shaft having the button 323 which may be, as illustrated, upon the side of the machine opposite from the operating handle 91. This ratchet wheel will thus rotate with the gear 319. An arm 326 is rotatably pivoted upon the stub shaft 320 carrying the ratchet wheel 325 so as to oscillate about the shaft 320. A pawl 327 is pivoted by a pin 328 to the arm 326 at a point exteriorly of the ratchet wheel. The pawl 327 is yieldingly pressed into engagement with the teeth of the ratchet wheel by a spring 329 that may be coiled around the pivot pin 328, anchored at one end to the pivot pin and with its other end bearing upon an ear 330 provided upon the pawl.

The arm 326 is provided with a slot 331 which extends radially of the stub shaft 320 for some distance inwardly from its outer end, then obliquely thereto, and then again radially towards the stub shaft 320. A pin 332 carried upon the free end of an arm 333 runs in the slot 331 so as to provide an actuating connection between the arms 333 and 326. The arm 333 is rotatably mounted upon the main driving shaft 90 which is operated by the handle 91 during the running in of the characters set up and their printing. An element 334 is pinned or keyed to the shaft 90 for rotation therewith, and is provided with two flanges 335 spaced angularly apart about the axis of the shaft 90, and including between them the arm 333. As the shaft 90 moves, either flange 335 will engage with the arm 333 and also rock it with the shaft 90, but the arm 333 does not fill the entire space between the flanges 335, so that there will be some lost motion between the arm 333 and the shaft 90.

The normal position of the paper feeding mechanism is shown in Fig. 24, except that the rollers 311 have been displaced into ineffective positions in a manner to be explained shortly. During the operation of the shaft 90, the arm 333 will remain stationary during a portion of the movement of the operating handle until the lower flange 335 engages it and carries it with it during the remainder of the forward movement of the handle 91. The arm 333 will rock the arm 326, during which movement the pin 332 will travel along the outer radial section of the slot 331, then through the oblique section into the other radial section which it reaches at the end of the forward stroke of the handle 91. During this movement the pawl 327 will run idly over the teeth of the ratchet wheel 325. Then during the return travel of the operating handle 91 the other flange 335 after some idle motion will pick up the arm 333 and carry it with it during the last portion of the return stroke. During this return movement of the arm 333, it will return the arm 326 from the position shown in Fig. 19 to the position shown in Fig. 24, the pin 332 returning through the slot 321 in a reverse manner.

The arm 326 will be moved largely while the pin 332 is in the oblique section of the slot 331, and then when it moves into the outer radial section, it will positively check the travel of the arm 326 during the last portion of its movement, so as to prevent overthrow of the ratchet wheel, such as might otherwise be caused by too rapid an operation of the operating handle 91. This movement of the ratchet wheel causes a feeding of the paper form through the slot 127 after the conclusion of the printing operation, but while the handle 91 is returning to its normal position. By reason of the lost motion connection between the arm 333 and the shaft 90, the feeding mechanism is inactive during the first section of the return movement of the handle 91, and an operator cannot return the handle to the intermediate position and then forwardly again to reprint, and thus by such movement give only a partial feeding of the form being printed upon.

In order that the feeding rollers 310 and 311 may be free for operation manually in order to properly center or position a form to be printed upon, a lever 336 may be pivoted at 337 to the frame 1, and provided with angular ends 338 and 339. The angular end 338 extends through a slot 340 in the frame so as to lie in the path of a tail portion of the pawl 327 when the pawl reaches its normal position shown in Fig. 24. The other angular end 339 of the lever 336 extends also through a slot 341 in the frame and into the path of an angular end 342 of the arm 333. Thus when the arm 333 closely approaches its normal position shown in Fig. 24, it will engage the angular end 339 of the lever 336 and rock the lever so as to cause engagement of its other angular end 338 with the tail of the pawl 327, and force it out of engagement with the ratchet wheel. The arm 333 immediately upon its movement away from its normal position will release the lever 336 and thus release the pawl 327 for reengagement with the ratchet wheel.

To adjustably vary the extent of feeding movement of the form being printed upon, a cam plate 343 is also oscillatably mounted upon the stub shaft 320 which mounts the ratchet wheel.

The plate 343 is mounted face to face with the ratchet wheel, and the nose of the ratchet pawl 327 is sufficiently wide to overlie both the ratchet wheel and an arcuate cam portion 344 of the plate 343. This arcuate cam portion 344 is located outwardly of the periphery of the ratchet wheel, so that while the ratchet pawl 327 is riding upon the cam 344 of the plate 343 it will be out of driving relation with the ratchet wheel as shown in Fig. 19.

The plate 343 is adjustable angularly from a point at which the ratchet pawl begins its driving stroke, as shown in Fig. 19, in the direction of its driving action upon the ratchet wheel, so that the angular movement of the arm 326, which mounts the ratchet pawl, before the ratchet pawl rides off the cam 344 into engagement with the ratchet teeth, may be varied in order to vary the extent of feeding movement that will be imparted to the feeding rollers 310. Obviously the plate 343 may be adjusted so that the ratchet pawl will not engage the ratchet wheel at any portion of its stroke, and when so adjusted, the feeding mechanism will be ineffective.

In order to adjust the plate 343 it may be provided with an arm 345 having a pin and slot connection to a lever 346 which is mounted for oscillation upon a pin 347 of the frame. The frame may have an arcuate slot 348 through which the pin of this last mentioned connection may extend and along which it may move during oscillation of the lever 346. The lever 346 may be provided with an arcuate slot 349 through which a clamping screw 350 may pass and by which the lever 346 may be clamped adjustably in different angular positions.

The feeding mechanism may also be rendered ineffective by separating the rollers 310 and 311 at both sides of the machine (see Figs. 24 and 25), and for this purpose the levers 312 which mount the feed rollers 311 may be provided with cam edges 351. A rod 352 extends across and is rotatably supported in the machine, and at its ends is provided with buttons 353 by which it may be oscillated about its axis. The rod 352 is provided with cam pins 354 which are adapted to engage with the cam edges 351 of the levers 312 and rock such levers, so that when the rod is oscillated, the cam pins 354 will engage with the cam edges 351 and rock the levers 312 in directions to remove the feed rollers 311 from the slot 127 and out of contact with the feed rollers 310.

In some instances it is desirable to observe the amounts which have been set up for printing before the actual printing occurs, in order that the amounts set up may be checked or verified. For that purpose I may provide indicator dial wheels 355 (Fig. 6) which are rotatably mounted upon a shaft 356 immediately back of a window 357 in the upper wall of the frame or casing of the machine, so that the indications upon the dial wheels may be observed in different combinations through the windows 357 (see also Fig. 1). Each dial wheel 355 is also provided with gear teeth 358 which mesh with pinions 359 provided upon the shaft 270 for gearing the dial wheels 355 individually to the gears 123 through the intermediate pinions 359ª, so that during the first section of the forward movement of the operating handle, the gears 123 which operate the printing dial wheels will also drive the indicating dial wheels 355 and set up a visible indication that may be inspected through the windows 357.

It is also frequently desirable to be able to ascertain definitely through how many steps the carriage has been moved by depression of the keys, in order that the number of digits set up may be verified. Accordingly an indicating slide 360 (Figs. 1, 3 and 6) may be slidably supported upon the shaft 168 by means of two laterally bent ears 361 through which the shaft 168 passes. This slide is provided with a depending arm 362 which is coupled to the carriage roller arm 219, so that as the carriage is stepped along, the indicator pointer of the slide will, while projecting through a slot 363 in the frame or casing, indicate by reference to suitable marks or characters 364 provided upon the exterior of the top of the casing or frame, the number of steps through which the carriage has been operated.

Inasmuch as some movement of the rack bars 75 must occur before they can be disengaged from the common operating bar 80 in the manner which has been explained, the dial wheels are provided with vacant spaces between the "nine" and "zero" types, so that all the dial wheels will always be moved this extra amount during setting up and printing operations, regardless of whether or not any keys have been operated. The unit dial wheel of the dollar group, and both of the cents dial wheels will also preferably have two zeros, so that if no set ups are made for these dials, they will always print "zeros". The other "zeros" are necessary for these dials in order that the zero keys may be operated to print zeros and step the carriage along in order to print the desired number of digits, and also print "zeros" when no numbers in those groups are set up.

In the event that the pins in all the rows of the carriage are not set, some provision must be made for disengaging from the common bar 80, the rack bars 75 that will not be affected by the set stops, or the travel of such bars should be such as to give their dial wheels a complete rotation. In the present instance a provision has been made for disconnecting such rack bars 75 from the common operating bar 80. For this purpose, the rear wall 365 of the carriage, for a distance forwardly of its travel from the first row of pins (see Fig. 18), depends to the extent that the pins would depend if set, so that when the carriage support is lowered in order to lower the set pins into the paths of the latch levers 77 on the rack bars, the depending portion of the wall 365 of the carriage will be lowered into the paths of the travel of the latch levers on the rack bars over which no pin row has yet been moved by the travel of the carriage. Thus, when the rack bars 75 are operated forwardly, they will be disengaged by this depending wall of the carriage before any of the latch levers 77 on the other rack bars are released by the pins which have been set as shown in Fig. 10. Thus, the rack bars for the higher digits not used in any set up will be automatically disconnected at the beginning of travel of the rack bars 75, in order to place their dial wheels in nonprinting position and their grooves for the "exactly" logotype in position to receive that logotype when the printing frame is lowered and the logotype slide actuating carriage is released.

In the operation of the machine which has been hereinbefore described and illustrated, and assuming the parts to be in their normal positions, a form to be printed upon is inserted in the slot 127. A single or short form may be inserted in the slot from the top if desired, or a number of connected forms, such as a roll of paper, may be inserted into the cylindrical holder 209 and the free end passed upwardly into the slot 127 for printing. If the simple form is to be printed upon, the arms 303 and 301 may be adjusted upwardly so as to support the form at the desired printing position, such as shown for example in Fig. 24 and Fig. 25. In such a case the feeding mechanism may be rendered inoperative by the rotation of the rod 352 in order to disengage the feed rollers 310 and 311. However, if desired, instead of elevating the arms 301 and 303, the rollers 310 and 311 may be left in engagement with one another, and the button 323 rotated in order to feed the form to be printed upon through the slot 127 to the desired position, the feed rollers holding the form in the particular printing position to which it is adjusted.

The operator then depresses the keys 23 selectively in order to set up the number or amount to be printed, the keys depressed being the keys or digits set up to be printed. The numbers or characters are set up by depressions of the keys in the order in which the digits or characters are to appear when set up and printed. During the selected depressions of the keys, the pins in the different rows will be depressed for as many rows as there are digits or characters to be selectively set up. During this setting up movement the carriage will be stepped along by the escapement mechanism, so as to place the set stops in positions over the latch levers of the rack bars 75, and to place the depending wall 365 of the carriage over the latch levers of the rack bars 75 that are connected to the dial wheels that are not to be used or printed.

After the keys have been operated to set up an amount in this manner, the operator pulls the handle 91 forwardly which causes a forward movement of the common operating bar 80, and the latter pulls the rack bars 75 forwardly until they are disengaged, either by the depending wall 365 of the carriage, or by the selectively set pins. At the very beginning of movement of the handle 91, however, the carriage is lowered so that the wall 365 and the set pins 48 are placed within the paths of travel of the latch levers 77 on the rack bars.

When the operating handle 91 has reached the intermediate position where the full stroke mechanism permits its movement in either direction, the dial wheels will have been turned or adjusted to the desired printing positions or settings, and the dial wheels 355 will indicate the particular amount which has been set up. If the amount set up is that which is desired, which will be the case if no error was made in the operation of the keys, the handle may be pulled further forwardly in order to lower the printing frame and release the "exactly" logotype which is then shifted into position adjacent the highest unit dial wheel of the dollar group which has been adjusted by the operation of the keys.

During the final forward movement of the handle 91, the platen bar 210 will be brought forwardly across the slot 127 and the form to be printed upon pressed against the type numbers or characters which were set up for printing, together with the logotypes "exactly", "dollars" and "cents". However, during the lowering of the printing frame, the inking rollers 177 were released and dropped into contact with the dial wheels, so that as the particular characters on those dial wheels to be printed were rotated into the printing line, they had a rolling contact with the inking rollers from which they received sufficient ink to print upon the forms when the latter was pressed against them by the platen bar of the platen yoke. The printing type and the platen bar may have cooperating teeth for shredding or mascerating the form while being printed in order to render changes in the amount printed practically, if not entirely, impossible without detection.

If the same amount set up is to be printed successively upon different forms, the repeat key stem 112 should be depressed and locked in depressed position, as shown in Fig. 33, at some time prior to the last half portion of the return movement of the handle 91. This repeat key will disengage the latch dog 105 from the extension 96 of the intermediate member 93, and thus break the driving connection between the operating shaft 90 and the main drive sector 92 which resets the dial wheels to normal position during the last portion of the return movement of the operating handle. After the complete return of the handle 91 with the repeat key stem depressed, it is merely necessary to pull the handle 91 forwardly again in order to repeat the printing of the same set up, and this operation may be continued indefinitely. During the successive operations, the type characters set up will be inked each time by the lowering of the printing frame.

If a roll of connected forms is being utilized, the plate 343 should be angularly adjusted so as to determine the extent of feeding of the strip at each operation. The shaft 352 should also be set in a position to release the lever 312, so that the feed rollers 310 and 311 will be in contact. Then during the last half of each return movement of the handle 91, the form will be shifted a desired extent through the slot 127. The presence of a form in the slot 127 will prevent movement of the lever 289 into locking position with the latch or stop 167 when the handle starts away from normal position and releases the lever 295. If the common locking bar 161 drops into locking engagement with all of the gears 123 at the end of the set up operation, the lever 167 will be elevated so as to lift its angular end 169 out of the path of travel of the stop 171 that moves with the handle 91.

The stop 171 is preferably made of such length, arcuately about the axis of the shaft 90, that as soon as its forward edge passes the angular end 169 of the stop lever 167, the arcuate edge will move beneath its angular end 169 and hold it in elevated position during the remainder of the printing operation, or forward stroke of the handle. By holding this lever 167 elevated, the common locking bar 161 will be held in locking position, and any movement of the dial wheels during the printing operation prevented. The carriage will be returned to normal position by the cam 216 which is operated during the latter part of the forward stroke of the handle 91, although the carriage may be returned manually at any time by manual operation of the button 221.

While the invention has been explained specifically in connection with its application to check writing machines, it will be understood that various features thereof which have been set forth in various combinations in the appended claims, are also equally applicable to other types of machines not necessarily adapted or used for check writing, and therefore, I do not wish to be limited to the art of check writing machines, except as set forth in particular claims of those hereto appended.

It will also be understood that various changes in details and arrangements of parts, which have been herein described and illustrated in order that the nature of the invention may be fully explained, may be made by those skilled in the art within the principle and scope of the invention as set forth and particularly pointed out in the appended claims.

I claim as my invention:

1. In a machine for setting up characters, a carriage support, a carriage movable across said support and having rows of depressible pins extending transversely of the travel of the carriage, escapement mechanism for controlling the travel of the carriage, key operated means controlling said escapement and beneath which the rows of pins move successively for setting at each operation of the escapement whereby any pin of any row in cooperative relation with the setting means at any time may be depressed, character bearing wheels, means for shifting said character wheels including elements shiftable beneath the carriage support and in a direction transverse to the travel of the carriage, means including a member for shifting all of said elements in a direction beneath the carriage into engagement with the depressed pins, each element being automatically disengaged from the operating member upon its engagement with a depressed pin, whereby the extent of movement of said elements and character wheels will depend individually upon the particular pins which are engaged by the related elements.

2. In a machine for setting up characters, a carriage support, a carriage movable across said support and having a plurality of rows of depressible pins, which rows extend transversely of the direction of travel of said carriage, escapement means for causing a step by step movement of carriage, depressible key devices disposed above said carriage for movement towards and from the same, a setting dog pivotally connected to each of said key devices, pins against which the stems of the dogs bear and along which they slide when the key devices are depressed, spring means connected to said dogs to hold them yieldingly against the pins during sliding movement and for normally yieldingly retracting the dogs and key devices to which they are connected, whereby as the rows of pins move successively beneath the dogs, the depression of any key device will depress a particular pin in that row of pins of said carriage which is in operative position beneath said dogs at that time.

3. In a machine for setting up characters, a key support, a pair of spaced rods on said key support and extending parallel to one another, a plurality of levers mounted on each rod and extending towards the other rod, each lever on one of said rods being rockably connected to an adjacent lever on the other rod, whereby said levers will oscillate in pairs, both levers of each pair having an aperture at equal distances from the rods upon which they are pivoted, key members carried by said frame and pivotally connected to one of each pair of said levers in its aperture, and means carried by one of each pair of levers having pin setting means connected thereto.

4. In a machine for setting up characters, a frame of sheet metal, a pair of spaced rods carried by said frame in parallel relation to one another, a plurality of lever arms having slots fitted over said rods and with the levers extending towards one another and each rockably connected to another upon the other rod, whereby said levers may operate in pairs, and each lever of the pair will hold the other against separation from its pivot rod, a key member pivotally connected to one lever of each pair, with the pivot connection between said key members at uniform distances from the rods upon which the particular levers are pivoted, whereby equal depressions of said key members will cause equal oscillations of said levers, and stop setting means connected to one lever of each pair.

5. In a machine for setting up characters, a frame, a pair of rods carried by said frame in spaced parallel relation to one another, a plurality of levers pivotally mounted upon each of said rods and extending towards those upon the other rod, each lever on each rod being rockably connected to a lever upon the other rod whereby said levers will oscillate in pairs, means for operating one lever of each pair to cause a concomitant movement of both levers of that pair, a stop supporting carriage movable beneath the levers and having rows of settable stops extending transversely to the direction of the carriage travel, and means carried by one of each pair of levers for setting stops on the carriage, said particular stop setting means being also arranged in a row parallel to the rows of stops, whereby as the carriage moves beneath the levers, the depression of any key will cause the setting of a particular stop on the carriage in the row which at that time is beneath the row of stop setting means.

6. In a machine for setting up characters, a frame, a pair of rods carried by said frame in spaced parallel relation to one another, a plurality of levers pivotally mounted upon each of said rods and extending towards those upon the other rod, each lever on each rod being rockably connected to a lever upon the other rod whereby said levers will oscillate in pairs, means for operating one lever of each pair to cause a concomitant movement of both levers of that pair, a stop supporting carriage movable beneath the levers and having rows of settable stops extending transversely to the direction of the carriage travel, means carried by one of each pair of levers for setting stops on the carriage, said particular stop setting means being also arranged in a row parallel to the rows of stops, whereby as the carriage moves beneath the levers, the depression of any key will cause the setting of a particular stop on the carriage in the row which at that time is beneath the row of stop setting means, escapement means for controlling the travel of said carriage, and means including a universal bar in operative relation to the levers on one of said rods for controlling the escapement, whereby when a lever is operated to set a stop on the carriage, the latter will be stepped along to present a new row of stops.

7. In a machine for setting up characters, a frame, a pivot rod, a plurality of levers arranged along said rod and pivotally mounted thereon, key elements connected to said levers for rocking the same individually, a dog pivotally connected to each lever, with the dogs arranged in a row parallel to the pivot rod, a limit rod arranged adjacent to said row of dogs and against which the dogs may all be rocked, spring means connected to said dogs for rocking them against the limit rod, for retracting their levers upwardly, and for holding said dogs in contact with said limit rods during the rocking of said levers, a carriage having rows of stops movable beneath the levers so as to be presented in rows successively beneath the row of dogs, whereby the operation of any lever will cause the setting of a particular stop in the particular row which at that time is in operative relation to the dogs.

8. In a machine for setting up characters, a frame, a pair of rods carried by said frame in spaced parallel relation to one another, a plurality of levers pivotally mounted upon each rod and extending toward the other rod, each lever being rockably connected to a lever upon the other rod, whereby said levers will operate in pairs, said levers having apertures at equal distances from their pivots, key stems supported by said frame and having projections pivoted in said apertures whereby said stems may be arranged in rows and connected to either lever of each pair, and whereby equal depressions of said keys will cause equal operations.

9. In a machine for setting up characters, a frame, a pair of rods carried by said frame in spaced parallel relation to one another, a plurality of levers pivoted on said rods, the levers on each rod extending toward those upon the other rod, each lever forming, with a lever upon the other rod, an operating pair, the levers of each pair having tongue and slot connections to one another whereby each lever on one rod will be rockably connected to a lever on the other rod, and a comb guide having slots in which the interlocking tongues and slotted ends of each pair of levers are received, held against disengagement from one another and guided in oscillation.

10. In a machine for setting up characters, a frame, a pair of rods carried by said frame in spaced parallel relation to one another, a plurality of levers having slotted ends embracing and rockably mounted on said rods, with the levers on each rod extending toward those on the other rod, said levers being arranged in pairs comprising one lever of each rod in adjacent planes, the levers of each pair having tongue and slot connections to one another to insure their concomitant operation together, and whereby each lever holds the other upon its rod, and a comb guide having slots in which the interlocking ends of both levers of each pair are received, held against disengagement from one another, and guided in oscillation.

11. In a machine for setting up characters, a frame, a pair of rods carried by said frame in spaced parallel relation to one another, a plurality of levers having slotted ends embracing and rockably mounted on said rods, with the levers on each rod extending toward those on the other rod, said levers being arranged in pairs comprising one lever of each rod in adjacent planes, one lever of each pair having a notch in its free end and the other lever of that pair having a tongue upon its free end rockably received in said notch, whereby each lever of a pair holds the other lever upon said rod, and a comb guide having slots in which the interlocking ends of both levers of each pair are received, held against disengagement from one another and guided in oscillation.

12. In a machine for setting up characters, a frame, a pair of rods carried by said frame in spaced parallel relation to one another, a plurality of levers having slotted ends embracing and rockably mounted on said rods, with the levers on each rod extending toward those on the other rod, said levers being arranged in pairs comprising one lever of each rod in adjacent planes, the levers of each pair having tongue and slot connections to one another to insure their concomitant operation together, and whereby each lever holds the other upon its rod, a comb guide having slots in which the interlocking ends of both levers of each pair are received, held against disengagement from one another, and guided in oscillation, said levers having apertures at equal distances from the rods on which they are pivoted, and a key stem connected to each lever of a pair through the aperture thereof.

13. In a machine for setting up characters, a frame, a pair of rods carried by said frame in spaced parallel relation to one another, a plurality of levers having slotted ends embracing and rockably mounted on said rods, with the levers on each rod extending toward those on the other rod, said levers being arranged in pairs comprising one lever of each rod in adjacent planes, the levers of each pair having tongue and slot connections to one another to insure their concomitant operation together, and whereby each lever holds the other upon its rod, a comb guide having slots in which the interlocking ends of both levers of each pair are received, held against disengagement from one another, and guided in oscillation, key elements guided by said frame and having flat stem portions with their planes extending transversely to said levers, each flat stem being slotted from its free end for receiving one lever of a pair, one arm of the slotted end of each stem having a tongue projecting into the slot and through an aperture in the lever so as to form a pivotal connection to that lever.

14. In a machine for setting up characters, a frame, a pair of rods carried by said frame in spaced parallel relation to one another, a plurality of levers having slotted ends embracing and rockably mounted on said rods, with the levers on each rod extending toward those on the other rod, said levers being arranged in pairs comprising one lever of each rod in adjacent planes, the levers of each pair having tongue and slot connections to one another to insure their concomitant operation together, whereby each lever holds the other upon its rod, and a comb guide having slots in which the interlocking ends of both levers of each pair are received, held against disengagement from one another, and guided in oscillation, a key element connected to one of each of said pairs of levers for rocking the same, stop setting means carried by said levers in a row extending parallel to said rods, a carriage movable in a direction between said rods and adjacent said stop setting means, and carrying successive rows of stops to be set, with the rows extending parallel to the row of stop setting means, whereby when the carriage is moved to carry any row of stops beneath the row of setting means, the depression of any key element will set a particular stop in that row of stops.

15. In a machine for setting up characters, a frame, a lever pivoted upon said frame, a key element guided by said frame and having a slotted portion embracing said lever, one arm of the element formed by the slot having a tongue projecting in a direction across the slot and pivotally received in said lever to form a pivotal connection between the key element and the lever.

16. In a machine for setting up characters, a support, a carriage movable along said support, a plurality of rows of settable pins carried by said carriage, with the rows extending transversely of the direction of travel of said carriage, a row of selective pin setting devices mounted adjacent the carriage, with the row extending parallel to the rows of pins, whereby as the carriage moves it will carry its rows of pins successively into operative relation with the rows of pin setting devices, whereby through selective operation of said devices, the pins in said rows may be selectively set, and a fixed cam device with which any set pins engage and are reset during a return movement of the carriage, whereby the set pins will be returned to initial positions by a return of the carriage.

17. In a machine for setting up characters, a support, a carriage movable along said support, a plurality of rows of settable pins carried by said carriage, with the rows extending transversely of the direction of travel of said carriage, a row of selective pin setting devices mounted adjacent the carriage, with the row extending parallel to the rows of pins, whereby as the carriage moves it will carry its rows of pins successively into operative relation with the rows of pin setting devices, whereby through selective operation of said devices, the pins in said rows may be selectively set, a cam device with which any set pins engage and are reset during a return movement of the carriage, whereby the set pins will be returned to initial positions by a return of the carriage, and escapement mechanism controlling the first mentioned movement of said carriage and controlled by said pin setting device, said escapement mechanism permitting a return of the carriage materially beyond the point at which the escapement mechanism will become effective, whereby said carriage may be returned sufficiently to reset the pins in all of the rows and then move forwardly through a distance sufficient to permit of the setting of pins in the first row.

18. In a machine for setting up characters, a carriage having plurality of rows of settable pins running transversely of the travel of the carriage, a row of pin setting devices arranged parallel to the rows of pins whereby as the carriage moves it will carry its rows of pins successively into operative setting relation with said setting devices, an escapement controlling the travel of said carriage, a universal bar controlling said escapement and in turn controlled by said setting devices, means for setting up characters in accordance with the pins which are set including means for displacing the carriage with its pins transversely of the plane of carriage movement, and locking means connected with such displacing means for obstructing movement of the universal bar whereby operation of said pin setting devices while characters are being set up will be prevented.

19. In a machine for setting up characters, a carriage provided with rows of settable pins and movable in a direction transverse to its rows of pins, means for selectively setting the pins in any row of said carriage as the carriage moves to carry its rows of pins successively into operative relation therewith, means including an escapement for controlling the travel of the carriage, a universal bar controlling said escapement, means including parallel linkage mechanism for displacing the carriage transversely to its plane of movement, one of the links of said such mechanism being projectable into obstructing relation to the universal bar when the carriage is displaced so as to prevent travel of the carriage and also prevent operation of said pin setting means, while the carriage is in its displaced position.

20. In a machine for setting up characters, including a plurality of operating elements movable through definite paths, the extents of movement of said elements determining the particular characters which are set up, a carriage movable transversely to the direction of travel of said elements and carrying rows of settable stops, means for setting the stops of said carriage selectively in each row as the carriage movement presents the rows thereto successively, escapement means controlling the travel of said carriage to present the rows of stops successively to said setting means, means for shifting said carriage after setting of the stops in a manner to carry the set stops into positions to limit the movements of said elements, and therefore determine the characters which will be set up, and means operative automatically upon the shifting of the carriage into obstructive relation to said elements for preventing operation of said escapement and of said stop setting means while the carriage is in obstructive relation to said elements.

21. In a machine for setting up characters, a carriage support having parallel tracks, a carriage having a plurality of rollers upon one edge therein running in one of said tracks, and a single roller upon the opposite edge running in the other track, whereby binding of said carriage in said tracks will be prevented, a plurality of settable elements carried by said carriage, element setting means arranged to come successively into operative relation with the elements of the carriage by the travel of said carriage along the tracks, and means controlled by the elements set up for setting up characters selectively.

22. In a machine for setting up characters, a carriage movable through a definite path, and carrying a plurality of settable pins arranged in rows running transversely to the said path, an escapement wheel connected to said carriage for controlling its movement, escapement dogs controlling said escapement wheel, means for setting the pins selectively in each row as presented, and also operating said dogs to step the carriage along and present a new row, a cam device in the path of said pins for resetting any set pins during the return movement of the carriage, and means carried by said escapement wheel for preventing control of the escapement wheel by said dogs during the last portion of movement of the carriage on its return stroke, whereby said carriage may complete a return stroke to reset all pins and then move forwardly before the escapement becomes effective in order to free the forward row of pins from said cam.

23. In a machine for setting up characters, a carriage support, a pin carriage movable along said support, pin setting means into operative relation with which the pins are carried in groups upon movement of said carriage along the support, means for mounting said carriage support for movement in a direction transversely to the plane of movement of said carriage, character setting means into operative relation with which the carriage is shifted on a displacement of said support, an operating lever pivoted to said mounting means, a second lever pivoted to said carriage, said levers being pivotally connected to one another at their free ends and with the second lever extending approximately parallel to the plane of travel of the carriage, along the support, spring means acting through said levers to propel the carriage along the support and also permit a displacement of said carriage with its support, and escapement means for controlling the travel of the carriage along its support.

24. In a machine for setting up characters, a frame, a plurality of character bearing wheels rotatably mounted on said frame, means for operating said wheels including rack bars mounted for reciprocation, a latch secured to each rack with an arm extending in the direction of movement of said racks, a common operating member with which all of said latch arms may engage and be moved together upon the operation of said member, and means for positioning abutments selectively in the paths of said latches during the movements of said racks by said common operating member, whereby said latches will be disconnected from said common operating member at different points in their travel depending upon the positions of the selectively placed abutments, the extents of movement of said racks up to the points of their disengagement from said common member determining the particular characters which will be set up by said wheels.

25. In a machine for setting up characters, a frame, a plurality of character bearing wheels rotatably mounted on said frame, means for operating said wheels including rack bars mounted for reciprocation, a latch secured to each rack with an arm extending in the direction of movement of said racks, a common operating member with which all of said latch arms may engage and be moved together upon the operation of said member, and means for positioning abutments selectively in the paths of said latches during the movements of said racks by said common operating member, whereby said latches will be disconnected from said common operating member at different points in their travel depending upon the positions of the selectively placed abutments, the extents of movement of said racks up to the points of their disengagement from said common member determining the particular characters which will be set up by said wheels, each rack having a portion overrunning with the common operating member while its latch is in engagement therewith, whereby while the latch is being disengaged from said member, the rack carrying such latch will be held against displacement with the latch in order to insure such disengagement.

26. In a machine for setting up characters, the combination of character setting mechanisms including a plurality of elements movable in definite paths and determining the characters set up by the extents of movement in such paths, a latch connected to each element, a common operating member with which said latches may engage in order to cause movement of all of said elements by said common member, and means for selectively placing latch disengaging abutments at different points in the paths of travel of said latches with said elements, whereby the engagement of any latch with an abutment will effect a disconnection of the element carrying that latch from said operating member, the disconnection of said element at selective points determined by said abutments controlling the characters which are set up by said mechanism.

27. In a machine for setting up characters, the combination of character setting mechanism including a plurality of elements movable in definite paths and determining the characters set up by the extents of movement in such paths, a latch connected to each element, a common operating member with which said latches may engage in order to cause movement of all of said elements by said common member, and means for selectively placing latch disengaging abutments at different points in the paths of travel of said latches with said elements, whereby the engagement of any latch with an abutment will effect a disconnection of the element carrying that latch from said operating member, the disconnection of said elements at selective points determined by said abutments controlling the characters which are set up by said mechanism, each of said elements and said common member having portions interengaging while coupled together by a latch for holding said element against movements with its latch in the direction of disengagement of the latch during such disengagement.

28. In a machine for setting up characters, the combination of character bearing elements, and operating means connected thereto including an individual operating rack for each character bearing element, said racks being guided for movement in parallel directions, a latch carried by each rack, a common operating member with which all of the latches may engage when in initial positions, whereby operation of said member will draw all of said racks together while they remain latched thereto, said latches being operable for disengagement in directions transverse to the movements of said racks, and selectively positioned abutments in the paths of travel of said latches, whereby said latches in striking said abutments will be released from the common member at points determined by the positions of the abutments with which they may engage, said racks having portions overrunning said common member while latched thereto and holding the racks against displacement with the latches during the disengagement of the latter from said member.

29. In a machine for setting up characters, a plurality of character bearing elements shiftable into positions to present different characters in a reference position, means for operating said elements into such positions including a member for each element and all movable in individual paths, a common operating member for said individual members and to which the latter are individually and detachably coupled, a device carrying a plurality of settable stops, means for selectively setting said stops, said device and stops being shiftable as a unit to position any set stops in the paths of said individual members so as to effect their individual disconnection from said common operating member at points dependent upon the positions of the stops with which they engage, means for shifting said device to place any set stops in positions to cause disengagement of said individual members from said common operating member during their common travel, and for holding the device in that position during continued movement of said common member, and means operable after the completion of such continued movement of said common operating member for disengaging said device from its holding means and returning it to normal position with its stops out of the paths of said individual members.

30. In a machine for setting up characters, a plurality of character bearing dials, driving means connected to said wheels and including individual operating members movable through parallel paths, a common operating member, a latch on each individual member and detachably engageable with said common member, whereby all said individual members may be operated with said common member until disengaged therefrom, a support carrying selectively settable stops movable into and out of a position in which the set stops are disposed in the path of travel of said latches for effecting their disengagement from the common member at points dependent upon the selective positions of said stops, means for shifting said support into and out of said position in which the stops are placed in the paths of the latches, including a latch device, cam means operable at approximately the beginning of movement of said common member for operating said latch device to shift the support into effective position and hold it in that position, and means operable after the completion of movement of all of said individual members for releasing said support for movement into ineffective position.

31. In a machine for setting up characters, a plurality of dial wheels bearing characters to be set up, driving means for said wheels including racks individually geared to said dial wheels, a common operating member to which said racks are detachably coupled, a support having selectively settable stops movable into an effective position in which the selectively placed stops will uncouple said racks from said common member at points in the movement of the common member determined by the positions of said set stops, an additional rack operable with said common member throughout its entire travel, a cam geared to the said additional rack, a cam follower lever running on said cam, means for shifting said support into effective position including a latch arm coupled to said follower whereby when the cam moves at the beginning of travel of the common member, said latch element will be operated to shift the support into effective position and hold it in that position during continued travel of the common member in the same direction, and means including an additional cam for uncoupling said latch element from said cam follower after approximately the completion of the travel of the common member in its rack movement, whereby said support may return to its ineffective position before the return of the common member to starting position.

32. In a machine for setting up and printing characters, a frame, a plurality of character bearing wheels, a sub-frame rotatably mounting said wheels side by side and oscillatable angularly to a limited extent, gear wheels individually rotatable about the axis of the pivot of the sub-frame and meshing with said dial wheels, means for operating said gear wheels to set up characters by the selective rotation of said character bearing wheels, means for giving the sub-frame angular movement so as to carry the dial wheels into printing position, a platen with which the dial wheels cooperate for printing when in printing position, and means for inking the characters that are positioned for printing during their movement with the frame into printing positions.

33. In a machine for setting up and printing characters, a frame, a pivot shaft in said frame, a plurality of gear wheels individually rotatable on said shaft, a sub-frame oscillatable about the axis of said shaft, character bearing wheels mounted for rotation about a common axis and each meshing with a gear wheel on said shaft, means for operating said gear wheels selectively and through them the character bearing wheels to present selected characters in a given position, means for holding said gears in adjusted positions, means for oscillating the sub-frame into printing position whereby said character bearing wheels will be rotated somewhat by reason of the meshing engagement with the held gear wheels, inking means with which the character bearing wheels engage as the frame moves into printing position so as to ink the characters which have been set up for printing and a platen device cooperating with the dial wheels when the sub-frame is in printing position for printing a record of the characters set up.

34. In a machine for setting up and printing characters, a frame, a pivot shaft in said frame, a plurality of gear wheels individually rotatable on said shaft, a sub-frame oscillatable about the axis of said shaft, character bearings wheels mounted for rotation about a common axis and each meshing with a gear wheel on said shaft, means for operating said gear wheels selectively and through them the character bearing wheels to present selected characters in a given position, means for holding said gear wheels in adjusted positions, means for oscillating the sub-frame into printing position whereby said character bearing wheels will be rotated somewhat by reason of the meshing engagement with the held gear wheels, inking means with which the character bearing wheels engage as the frame moves into inking position so as to ink the characters which have been set up for printing, a platen device cooperating with the dial wheels when the sub-frame is in inking position for printing a record of the characters set up, said printing means being movable into and out of a position where it engages with the character bearing wheels during their movement with the sub-frame, and means for causing movement of said printing means into position to engage the character bearing wheels during the movement of the said frame in a direction to carry the character bearing wheels into printing position.

35. In a machine for setting up and printing characters, a frame, a plurality of gear wheels mounted in said frame for rotation upon a common axis, a sub-frame mounted in said frame for oscillation about said common axis, a plurality of dial wheels bearing characters to be selectively set up in combinations mounted in said sub-frame for rotation about another axis, means for selectively operating said gear wheels to different extents and thereby operating said dial wheels to different extents in order to set up the characters in a particular selected combination, means for shifting said sub-frame into printing position and holding the gear wheels against rotation, whereby said dial wheels will be rotated through a given angular extent to present the set up combination in printing position, and means cooperating with the dial wheels for printing, while the sub-frame is in printing position, a record of the characters set up.

36. In a machine for setting up and printing characters, a frame, a plurality of gear wheels mounted in said frame for rotation upon a common axis, a sub-frame mounted in said frame for oscillation about said common axis, a plurality of dial wheels bearing characters to be selectively set up in combinations mounted in said sub-frame for rotation about another axis, means for selectively operating said gear wheels to different extents and thereby operating said dial wheels to different extents in order to set up the characters in a particular selected combination, means for shifting said sub-frame into printing position and holding the gear wheels against rotation, whereby said dial wheels will be rotated through a given angular extent to present the set up combination in printing position, and means cooperating with the dial wheels for printing while the sub-frame is in printing position, a record of the characters set up, said cooperating means including a device for inking the characters set up on said dial wheels for printing as the sub-frame moves into printing position, and a platen device cooperating with inked dial wheels after the latter have been moved into printing position with said sub-frame.

37. In a machine for setting up and printing characters in selective combinations, a frame, a plurality of gear wheels mounted in said frame for individual rotation about a common axis, a sub-frame mounted in said frame for oscillation about said common axis, a plurality of dial wheels carried by said sub-frame and separately rotatable, each dial wheel being in meshing engagement with one of said gear wheels on the common axis, a lever pivoted in said frame and connected to said sub-frame to oscillate the same when said lever is rocked, a cam for operating said lever to cause an oscillation of said sub-frame into and out of printing position, means for operating said gear wheels and through them rotating said dial wheels into relative positions into which they present selected characters in combination, said dial wheels being further rotatable through a given angular extent about their axis by the movement of the sub-frame when the latter is shifted into printing position so as to present the said set up combination of characters on said dial wheels in printing position, and means for making a printed record of the combination thus set up.

38. In a machine for setting up and printing characters in selective combinations, a frame, a plurality of gear wheels mounted in said frame for individual rotation about a common axis, a sub-frame mounted in said frame for oscillation about said common axis, a plurality of dial wheels carried by said sub-frame and separately rotatable, each dial being in meshing engagement with one of said gear wheels on the common axis, a lever pivoted in said frame and connected to said sub-frame to oscillate the same when said lever is rocked, a cam for operating said lever to cause an oscillation of said sub-frame into and out of printing position, means for operating said gear wheels and through them rotating said dial wheels into relative positions into which they present selected characters in combination, said dial wheels being further rotatable through a given angular extent about their axes by the movement of the sub-frame when the latter is shifted into printing position so as to present the said set up combination of characters on said dial wheels in printing position, and means for making a printed record of the combination thus set up, said last named means including a device for inking such combination of characters, and a platen cooperating for printing purposes with said inked combination of characters when the latter are in printing position.

39. In a machine for setting up and printing characters, a frame, a plurality of gear wheels mounted in said frame for rotation about a common axis, character bearing wheels connected to said gear wheels, means for rotating said gear wheels selectively in order to rotate said character bearing wheels and present selected characters for printing, a common locking pawl extending along all of the gear wheels and engageable therewith to hold the same against movement, a cam element mounted for rotation about the axis of said gear wheels and having a plurality of notches therein, a cam follower connected to said pawl and running on said cam disc, said pawl being spring pressed against the cam disc so as to snap its follower into a notch when the notch moves into alignment therewith and lock all of the gear wheels against rotation, inking means shiftable into and out of cooperative relation to the characters set up for printing purposes on said character bearing wheels, means for controlling such shifting movement of the inking means, and means for first operating said gear wheels to set up a combination of characters on the character bearing wheels, and then rotating said cam disc to lock the gear wheels, and release the inking means for movement into effective position.

40. In a machine for setting up characters in selected combinations, a plurality of gear wheels mounted for rotation on a common axis, character bearing elements connected to said gear wheels and operated thereby to set up the characters in combinations depending upon the relative movements of the gear wheels, a plurality of rebound dogs cooperating with said gear wheels to prevent their overrunning and spring pressed individually into contact with the gear wheels, a common controlling member operable upon all of said rebound dogs to disengage them from said gear wheels, means yieldingly urging said member in a direction to remove the rebound dogs from engagement with said gear wheels, a latch element cooperating with said common member for holding it in a position where it is ineffective upon such rebound dogs, means for operating said gear wheels to cause the setting up of a particular combination of characters, and means operable subsequently to the setting up of the characters for disengaging the latch from said common member and permitting movement of the latter to disengage all of said rebound dogs from the gear wheels.

41. In a machine for setting up characters, a plurality of gear wheels controlling the characters to be set up, means for operating said gear wheels through variable extents in order to set up variable combinations of characters, an individual rebound dog spring-pressed into engagement with each gear wheel, a common member for shifting all of said rebound dogs out of engagement with said gear wheels, a latch element engaging with said common member for normally holding it in a position where it is ineffective upon said rebound dogs, and cam means for operating said latch in a direction to release the common member, and cause a disengagement of said dogs from the gear wheels, and cam means for subsequently returning the common member to ineffective and latched position.

42. In a machine for setting up characters, a plurality of gear wheels mounted for rotation about a common axis, a rebound dog spring-pressed into engagement with each gear wheel, a common member engageable with all of said rebound dogs for shifting them all out of engagement with said gear wheels, said common member having a latching abutment, a pivotally mounted latch arm having a latch nose normally bearing against said member and engageable with said abutment to latch the common member in a position where it is ineffective upon said dogs, spring means for normally urging the common member in a direction to remove the rebound dogs from the gear wheels and for urging said latch arm into engagement with said member, and cam means operative upon the latch arm to release said common member to permit its dog disengaging operation, and subsequently to shift said common member into ineffective position and permit reengagement of the latch nose with said abutment.

43. In a machine for setting up characters, a plurality of gear wheels, means for operating said gear wheels to variable extents, a plurality of rebound dogs individually cooperating with said gear wheels to yieldingly hold them in adjusted positions, a common member operable upon the dogs to disengage them from said gear wheels when shifted in one direction, said common member being pivotally mounted and having a bearing surface with an abutment therein, a pivotally mounted latch element having a latch nose bearing upon said cam surface and engageable with said abutment to latch the common member against movement in a direction to carry the dogs out of engagement with said gear wheels, spring means yieldingly urging the latch element into latching engagement with said common member and for urging said common member in a direction to carry the dogs out of engagement with the wheels, and cam means operable upon said latch element during one movement to release said common member and during another movement to shift said common member into ineffective latched position.

44. In a machine for setting up characters, a plurality of character controlling gear wheels mounted for individual rotation upon a common axis, rebound dogs associated with said gear wheels and mounted for pivotal movement about a common axis, a common controlling member engageable with all of said dogs to shift them out of engagement with said wheels, springs connected between the dogs and the common member for urging said dogs individually into engagement with said gear wheels, an arm extending from said common member and having a shouldered cam surface, a pivoted latch lever bearing against said cam surface of the arm, whereby when it engages with said shoulder, it will hold said common member in a position where it is ineffective upon said dogs, a common spring connected between said latch lever and said arm for normally urging said common member in a direction to remove said dogs from said gear wheels, and for yieldingly holding said latch lever against said cam surface, whereby it will snap into latching engagement with said abutment when said common member is shifted into ineffective position, and cam means operative during one movement, upon said latch lever to shift it out of engagement with said abutment to release the common member, and during another movement to cam said common member into ineffective latched position.

45. In a machine for setting up characters, a plurality of operating elements having notched surfaces shiftable through variable extents in order to selectively control the combinations of characters set up, a common locking bar engageable with the notched surfaces of said elements after their variable selected movements, character bearing elements selectively positioned by said notched elements, means for causing a printing of the characters selectively set up, means operative first to shift said notched elements and selectively present a combination of characters for printing, and then causing a printing of such characters, and means controlled by said locking bar for preventing the printing movement when said bar is out of locking engagement with the notches of said notched elements.

46. In a machine for setting up characters, individually adjustable character bearing members for presenting a series of characters in selected combinations, means for printing a record of the combination of characters set up at anytime, means for individually adjusting said members including an operating pinion, a drive shaft, a gear rotatable on said shaft, an element secured to and rotating with said shaft, an intermediate member rotatable on said shaft and having a radial extension, a pawl carried by the gear and engageable with one side edge of the extension to form a driving coupling between the gear and intermediate member, said element having a lug engaging with said intermediate member for driving it in one direction, and a pawl carried by said element also engaging with said intermediate member for driving it in the other direction and operable out of coupling relation to said intermediate member, a relatively stationary cam device with which the gear pawl may engage during its movement with the shaft, whereby said gear will be disengaged from the shaft after a given angular movement therewith, so as to permit of further angular movement of the shaft independently of the gear, and means shiftable into and out of the path of the pawl on said element for selectively disengaging the latter at approximately the limit of movement of said shaft, whereby during the return of the shaft the element will be disconnected from the intermediate member and gear for repeat purposes, and means operable from said shaft for causing an operation of said printing means during the continued movement of the shaft after the disengagement of said sector gear.

47. In a machine for setting up and printing a record of characters, character bearing members selectively adjustable, means for obtaining a printed record of the characters presented for printing at any time, means for selectively setting said members including an operating pinion, a drive shaft, a gear member loose on said shaft, an element rotating with said shaft, an intermediate member loose on said shaft, a pawl carried by said gear member and engageable with said intermediate member to cause operation of said gear member in one direction when the intermediate member is operated in one direction, said element and intermediate member having interengaging abutments whereby operation of said shaft in said one direction will operate said intermediate member and through it the gear member, relatively stationary means engageable with said pawl as the gear member is rotated for shifting the pawl and uncoupling the gear member from said intermediate member after a given angular movement of the shaft in said one direction, means controlled by the shaft during continued movement in the same direction after disengagement from the gear member for causing an operation of said printing means, and disengageable means connecting the intermediate member and element for causing movement of the intermediate member and element together in the reverse direction unless said disengageable means is uncoupled from said intermediate member.

48. In a machine for setting up and printing characters, individually adjustable members bearing characters to be presented in selected combinations, means for selectively adjusting said members including a gear member, a drive shaft upon which the gear member is loosely mounted, means rotatable with the shaft in one direction, a pawl carried by said gear member and engageable with the last named means to cause movement of the gear member with the shaft during a given angular extent of movement, relatively stationary means engageable by said pawl during the movement of the gear member for disengaging the pawl and thereby uncoupling the gear member from the shaft at the end of said angular movement in order to permit continued movement of the shaft, and means operated by said shaft during its continued movement for printing a record of the characters set up during the movement of the gear member with the shaft.

49. In a machine for setting up and printing selected characters, individually adjustable character bearing members for presenting selected combinations for printing purposes when individually adjusted, means for selectively adjusting said members including an operating gear member, a shaft upon which said gear member is loosely mounted, an intermediate member also rotatable on the shaft, means for detachably coupling said intermediate member to said gear member and to said shaft, means for causing disengagement of the coupling means between the gear member and the intermediate member after a given angular movement of the gear member with the shaft, and permitting continued movement of the shaft, means operable by the shaft during its continued movement for printing a record of the combination of characters set up, and means for selectively causing disengagement of said intermediate member and shaft after the gear member has set up a combination for printing, whereby during the return stroke of the shaft said combination will remain set up for reprinting during a succeeding stroke of said shaft.

50. In a machine for setting up and printing selected characters, individually adjustable character bearing members for presenting the characters in selected combinations for printing purposes when individually adjusted, means for selectively adjusting said members including an operating gear member, a shaft upon which said gear member is rotatably mounted, a clutch device connecting the shaft and gear member to insure their movement together in one direction, means for causing operation of the clutch means to disengage the gear member from the shaft after a given angular movement together, so as to permit continued movement of the shaft in the same direction independently of the gear member, and means operated by the shaft during such continued movement for printing a record of the character combination set up.

51. In a machine for setting up and printing selected characters, a setting clutch comprising a drive shaft, a gear member rotatably mounted on said shaft, an element fixed on said shaft, an intermediate member rotatably mounted on said shaft, a pawl carried by the gear member and movable into latching engagement with the intermediate member to couple said members for concomitant movement, relatively stationary means disposed within the path of travel of said pawl for engaging and rocking said pawl into disengaged position after a given angular movement with said intermediate member, said intermediate member having an arcuate portion engageable with said pawl after a disengagement of said pawl therefrom, said arcuate portion having a notch, a locking pawl engageable with said arcuate portion and then said notch after a given extent of continued movement of said intermediate member for yieldingly holding the member in the position it occupies at its limit of movement, and means for disengageably coupling the intermediate member to said shaft, whereby when the disengagement occurs while said locking pawl is in the notch of said intermediate member, the pawl will yieldingly hold the intermediate member against undesired movement with said shaft.

52. In a machine for setting up and printing characters in selected combinations, a setting clutch comprising a drive shaft, an element secured to and rotating with said shaft, an operating gear member rotatably mounted on said shaft, an intermediate member also rotatably mounted on said shaft, a pawl carried by one of the members and engageable with the other member to detachably couple them for movement together, said element having means engaging with said intermediate member and moving it in one direction upon operation of the shaft in one direction, pawl means detachably coupling said element and intermediate member to cause movement of the latter with the shaft while operating in the other direction, relatively stationary means engageable by the pawl coupling said members at a selected point in the movement of the gear member for uncoupling the gear member and permitting a continuing movement of the intermediate member with said shaft, and means engageable by said pawl means at the limit of the continued movement for uncoupling the intermediate member and element, whereby the shaft and element may return to a normal position without the intermediate member.

53. In a machine for setting up and printing characters in selected combinations, a setting clutch comprising a drive shaft, an element secured to and rotating with said shaft, an operating gear member rotatably mounted on said shaft, an intermediate member also rotatably mounted on said shaft, a pawl carried by one of the members and engageable with the other member to detachably couple them for movement together, said element having means engaging with said intermediate member and moving it in one direction upon operation of the shaft in one direction, pawl means detachably coupling said element and intermediate member to cause movement of the latter with the shaft while operating in the other direction, relatively stationary means engageable by the pawl coupling said members at a selected point in the movement of the gear member for uncoupling the gear member and permitting a continuing movement of the intermediate member with said shaft, and means engageable by said pawl means at the limit of the continued movement for uncoupling the intermediate member and element, whereby the shaft and element may return to a normal position without the intermediate member, said last named means being adjustable into and out of a position in which it is engageable with the pawl means.

54. In a machine for setting up and printing characters, character bearing means, means for operating said character bearing means to present characters in selective combinations for printing and including an operating shaft, an element rotatable on said shaft, a member fixed to said shaft, a pawl carried by said element and engaging with said member to cause movement of said element and member together with said shaft in one direction, said element and member also having interengaging portions providing a lost motion driving connection between them in the other direction, a relatively fixed cam disposed in the path of movement of said pawl for disengaging it from said member after a limited movement together in said other direction, so as to permit continued movement of said member in the same direction as permitted by said lost motion connection, and printing means connected to and operable by said element when said lost motion connection between the member and element becomes effective during movement of said element in said other direction, whereby operation of said shaft will first set the character bearing means for printing and then when the lost motion connection to said element becomes effective, operate the printing mechanism by continued movement in the same direction, the pawl connection insuring return of said printing means to inactive position at the beginning of the return stroke, and then being disengaged automatically from the shaft to permit the complete return of the shaft to normal position.

55. In a machine for setting up and printing characters, character bearing means selectively adjustable to present the characters in different combinations for printing, means for operating said character bearing means, including a plurality of elements movable through definite paths, a common operating member to which the elements are detachably coupled for operation therefrom, a carriage movable transversely of the travel of the elements, a plurality of rows of settable stops on said carriage which are carried by said carriage into positions to disconnect the elements from the common operating member at variable points in their travel depending upon the stops which they engage, means for operating the common operating member including a drive shaft, a gear rotatable on said shaft and having a lost motion driving connection thereto whereby said gear will be inactive during the initial part of the shaft operation while said common operating member is being operated to selectively vary the characters presented, printing means operated by said gear while said gear is operated during the latter part of the operation of the shaft in the same direction for printing a record of the characters presented for printing, means for returning the carriage to starting position, including a pinion driven from said gear during its operation to effect the printing, and means for detachably coupling the gear and shaft after the initial portion of their movement together for insuring their travel together at the beginning of the return stroke without lost motion, and means for uncoupling said gear and shaft during the latter part of the return stroke so as to permit of the movement of the shaft independently of the gear as permitted by the lost motion connection between them.

56. In a machine for setting up and printing characters selectively, a plurality of character bearing members individually adjustable to present selected combinations of characters for printing, means for locking said members in adjusted positions for printing, printing means, means for selectively adjusting said character bearing members, means for supporting a sheet to be printed in printing position, and means for operating said character adjusting means and then subsequently said printing means at a single operation, and means controlled by the presence of a sheet in said support and by said locking means for preventing operation of said operating means into the printing section of this single operation when the members are not locked or no sheet is in said support to be printed upon.

57. In a machine for setting up and printing characters selectively, a plurality of characters bearing members individually adjustable to present selected combinations of characters for printing, means for locking said members in adjusted positions for printing, printing means, means for selectively adjusting said character bearing members, means for supporting a sheet to be printed in printing position, and means for operating said character adjusting means and then subsequently said printing means at a single operation, and means controlled by the presence of a sheet in said support and by said locking means for preventing operation of said operating means into the printing section of this single operation when the members are not locked or no sheet is in said support to be printed upon, said controlling means being jointly controlled by the sheet in said support and the locking means.

58. In a machine for setting up characters, a plurality of character type bearing elements individually adjustable to present characters in different combinations, means for printing a record of the combination set up, common operating means for adjusting said elements and operating said printing means in sequence, including a common operating handle, common means for locking the character type bearing elements in adjusted positions before the beginning of the printing operation, and means controlled by the last named means for preventing operation of said handle for printing purposes when said common locking means is ineffective upon said elements.

59. In a machine for setting up and printing characters, character type bearing members individually adjustable to present various selected combinations of character type for printing purposes, means for printing a record of any combination set up, common operating means for first selectively adjusting said character bearing members, and then operating said printing means, and including a common operating element, means for supporting a form to be printed upon in printing position, and means including a feeler extending into operative relation to said supporting means for obstructing printing operation of said common element in the absence from said support of a form to be printed upon.

60. In a machine for setting up and printing characters, a plurality of individually adjustable character bearing members, means for selectively setting said members to print various combinations, means for printing a record of any combination set up, common means for first adjusting said character bearing members and then subsequently operating said printing means, means for supporting a form to be printed upon in printing position, means for locking said character bearing members in adjusted positions during a printing operation, and effective upon said common means for preventing the printing section of its operation when the character bearing members are unlocked, and means including a feeler in operative relation to said supporting means for holding the locking means in position to prevent a printing movement of said common operating means in the absence from printing position of a form to be printed upon.

61. In a machine for setting up and printing characters, individually adjustable character bearing members, means for selectively adjusting said members to present selected combinations for printing purposes, including a common operating member, means operated by said common operating member after its adjustment of said members for causing a printing of the record of the combination set up during a continuance of its movement in the same direction, and means effective upon said common operating member for preventing reversals in directions of movement when out of positions at its limits of travel, and at an intermediate position which it occupies between the setting up section of its movement, and the printing section of its movement.

62. In a machine for setting up and printing characters, a shaft, a plurality of gear wheels individually rotatable on said shaft, a printing frame oscillatable on said shaft, a second shaft carried by said printing frame and oscillatable therewith, a plurality of type bearing wheels separately rotatable on said second shaft and geared to said gears on the first shaft, means for operating said first gears to individually adjust said type bearing wheels, and means for locking said first gears after their adjustment of the type bearing wheels and also for lowering the printing frame subsequently into printing position, whereby a planetary movement will be given the type bearing wheels to present a selected type combination for printing.

63. In a machine for setting up and printing characters, a shaft, a plurality of gear wheels individually rotatable on said shaft, a printing frame oscillatable on said shaft, a second shaft carried by said printing frame and oscillatable therewith, a plurality of type bearing wheels separately rotatable on said second shaft and geared to said gears on the first shaft, means for operating said first gears to individually adjust said type bearing wheels, means for locking said first gears after their adjustment of the type bearing wheels and also for lowering the printing frame subsequently into printing position, whereby a planetary movement will be given the type bearing wheels to present a selected type combination for printing, said type bearing wheels at one end of the group having in their periphery transverse grooves which are aligned when the wheels are in normal unadjusted printing positions, a logotype including a portion fixed on said shaft and having gear teeth, and also including a type portion slidable in a direction endwise of the shaft and into any adjacent aligned grooves of the type wheels, a relatively fixed gear on said first shaft meshing with said gear teeth on the portion of the logotype which is fixed on the shaft for causing planetary movement of said logotype with said type bearing wheels when the printing frame is lowered, said frame and the shiftable part of said logotype having interengaging portions preventing endwise movement of the movable section of said logotype until the printing frame reaches its printing position after the planetary movement, and spring actuated means effective upon the shiftable section of the logotype when it reaches printing position with the printing frame for shifting it into any of the grooves of the type bearing wheels which are aligned therewith.

64. In a machine for setting up and printing characters, a plurality of individually adjustable type bearing members, means for rocking said members into printing position, inking rollers supported adjacent the members and biased into contact with the same, whereby the movement of said members into a printing position will cause a rolling engagement of the portions of the type members set up for printing with said inking rollers, means normally holding said inking rollers out of engagement with said type bearing members while the latter are being adjusted, and means operative upon the movement of the type bearing members into printing position for releasing the inking rollers for movement into contact with the type bearing members as the latter moves into printing position.

65. In a check writing machine, a frame having a support for receiving a check or other small form to be printed, a platen mounted adjacent said support, a plurality of printing members for impressing said form on the side thereof opposite said platen, said members being selectively adjustable to print different characters in combination and shiftable as a unit in a plane substantially perpendicular to said platen from a position out of alinement with the platen to a position in alinement therewith to cooperate with said platen, means comprising a plurality of selectively operable keys for selectively adjusting said printing members, and means for causing relative impressing movement of the platen and printing members to print a selected combination of characters on said form.

66. A check writing machine comprising a support for receiving a check or other small form to be printed, a platen and a plurality of individually adjustable printing members disposed at opposite faces respectively of said form, a carriage mounting a plurality of settable stops, means for selectively setting said stops comprising a plurality of selectively operable keys and means for first adjusting said members to print selected characters in combinations controlled by the selectively set stops and then causing relative movements of the members as a unit and of the platen for printing a selected combination of characters upon said form.

67. In a check writing machine, a support for receiving and mounting a small form to be printed, a plurality of selectively adjustable printing members, means comprising a plurality of selectively operable keys for selectively adjusting said printing members to print selected characters in combination, means for causing a printing operation of said members upon said form, means for locking said members against relative displacement from adjusted positions during the printing operation, an element displaced by said form when the latter is mounted in printing position in said support, and means controlled jointly by said element and said locking means for preventing the printing operation in the absence of a form to be printed upon from printing position in said support, and when said members are unlocked.

68. A printing apparatus comprising a casing having an externally opening recess adapted to receive checks and other relatively small paper forms to be printed, a platen on one side of said recess, a plurality of type carriers on the other side of said recess, said carriers being individually adjustable to bring selected combinations of type forms to printing position, a plurality of keys, a carriage having a plurality of stops selectively adjustable by said keys and also an escapement mechanism controlled by said keys, devices connected with said type carriers to adjust the same, means for operating said devices and carriers, said means including a movable member and latching mechanism for connecting said devices to said movable member, said devices being unlatched from said movable member in accordance with the setting of said stops, and means for effecting a relative printing movement of said carriers and platen.

69. A printing apparatus comprising a casing having an externally opening recess adapted to receive checks and other relatively small paper forms to be printed, a platen on one side of said recess, a plurality of type carriers on the other side of said recess, said carriers being individually adjustable to bring selected combinations of type forms to printing position, a plurality of keys, a carriage having a plurality of stops selectively adjustable by said keys and also an escapement mechanism controlled by said keys, a plurality of bars movable transversely of the escapement movement of said carriage and having a connection with said carriers to control the adjustment thereof, means for effecting selective movement of said bars and carriers, said means including a movable member and latching mechanism for connecting said bars to said movable member, said bars being unlatched from said member in accordance with the setting of said stops, and means for causing relative compressing movement of said carriers and platen.

70. A printing apparatus comprising a casing having an externally opening recess adapted to receive checks and other relatively small paper forms to be printed, a platen on one side of said recess, a plurality of type carriers on the other side of said recess, said carriers being individually adjustable to bring selected combinations of type forms to printing position, a plurality of keys, a carriage having a plurality of stop pins adjustable by said keys and having an escapement movement controlled by said keys, a plurality of rack bars, gears connecting said rack bars with respective ones of said type carriers for adjusting the same, means for operating said rack bars and carriers, said means including a movable member and latching mechanism for connecting said bars to said movable member, said bars being unlatched from said member in accordance with the setting of said stop pins and means for effecting a relative printing movement of said carriers and platen.

71. In a check writer, the combination of selecting keys, a laterally shiftable carriage controlled by said keys and carrying vertically shiftable pins movable by the keys into depressed positions, type bearing wheels, slidable rack bars beneath the carriage operatively connected to the wheels for adjusting the same to place the desired type in operative position, and means for lowering the carriage to bring the depressed pins into the paths of the rack bars, to limit their sliding movement, and thus select the type to be printed in accordance with the selector key operated.

72. In a check writer, means for selecting the characters to be printed, means for printing the selected characters, common operating means for actuating and controlling the selecting means and the printing means, and connections between the common operating means and the selecting means and printing means so arranged that the selecting means and printing means are operated in sequence, and are controlled positively during the intervals between operations.

73. In a check writer, means for setting up the characters to be printed, means for printing the characters so set up, common operating and locking means for actuating and locking both the setting up means and the printing means, and operative connections between the common operating means and the setting up means, and between the common operating means and the printing means, so arranged that the setting up means and printing means are actuated individually in sequence during a single operation of the common operating means, said connections including means which positively lock the setting up means and the printing means when the driving connections thereto are broken.

74. In a check writer, the combination of a carriage shiftable in one direction, a plurality of series of stop members mounted on said carriage and shiftable as a unit therewith, instrumentalities for setting selected stop members and for controlling said shifting of said carriage, printing instrumentalities, movable members operatively connected to said printing instrumentalities, and means for moving said carriage in a direction other than said direction of shifting of the carriage to bring the set stops thereon into cooperative relationship with said movable members to control the movements of said members and thus to control the setting of said printing instrumentalities.

WALTER B. PAYNE.